United States Patent
Nagasawa et al.

Patent Number: 5,877,906
Date of Patent: *Mar. 2, 1999

[54] DEVICE FOR SWITCHING BETWEEN MULTIPLE RECORDING MEDIA BASED ON A RECORDABLE TIME REMAINING CALCULATION

[75] Inventors: Fumihiro Nagasawa; Akira Takano; Takeo Nishijima; Kimio Kokubun, all of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 650,899

[22] Filed: May 17, 1996

Related U.S. Application Data

[63] Continuation of Ser. No. 260,388, Jun. 14, 1994, abandoned.

[30] Foreign Application Priority Data

Jun. 16, 1993 [JP] Japan .................................. 5-145002

[51] Int. Cl.⁶ .................................................. G11B 15/02
[52] U.S. Cl. .................................................. 360/15; 360/69
[58] Field of Search .................................. 360/15, 69, 71, 360/5, 60

[56] References Cited

U.S. PATENT DOCUMENTS

| | | | |
|---|---|---|---|
| 3,885,090 | 5/1975 | Rosenbaum | 360/33.1 X |
| 5,008,762 | 4/1991 | Sung | 360/69 |
| 5,016,123 | 5/1991 | Karsh | 360/69 |
| 5,164,915 | 11/1992 | Blyth | 360/69 |
| 5,189,524 | 2/1993 | Yoshida et al. | 360/71 |
| 5,194,963 | 3/1993 | Dunlay et al. | 360/15 |
| 5,208,627 | 5/1993 | Yoshihara et al. | 355/23 |
| 5,349,477 | 9/1994 | Shubo | 360/15 |
| 5,386,325 | 1/1995 | Kim | 360/15 |

FOREIGN PATENT DOCUMENTS 1-31526    8/1990    Japan .

Primary Examiner—Nabil Hindi
Assistant Examiner—James L. Habermehl
Attorney, Agent, or Firm—Frommer Lawrence & Haug, LLP; William S. Frommer

[57] ABSTRACT

A single unit video camera recording apparatus comprising multiple recording devices for accommodating removable recording media. Each of the recording devices has a circuit for detecting the remaining amount of the recording medium available. The recording apparatus has a control circuit for switching between the multiple recording devices in response to a comparison with the detected remaining amount and a preset value along with other factors, including the operating mode that has been selected for the apparatus.

16 Claims, 15 Drawing Sheets

DEVICE FOR SWITCHING BETWEEN MULTIPLE RECORDING MEDIA BASED ON A RECORDABLE TIME REMAINING CALCULATION

This application is a continuation of application Ser. No. 08/260,388, filed Jun. 14, 1994, now abandoned.

BACKGROUND OF THE INVENTION

1. Field of the Invention

The present invention relates to a single-unit video camera-recording apparatus and a recording apparatus for use in a single-unit video camera-recording apparatus and a recording apparatus using a variety of recording media, such as an optical disc, a magnetic tape, a magnetic disc or the like, for example.

2. Description of the Prior Art

FIG. 1 of the accompanying drawings shows an example of a conventional single-unit video camera-recorder. This single-unit video camera-recorder comprises a camera unit and a VTR (video tape recorder) unit secured together or the VTR unit detachably attached to the camera unit to record a video signal obtained from a CCD (charge-coupled device) on a magnetic tape by the VTR unit.

According to the single-unit video camera-recorder shown in FIG. 1, when the user (referred to hereinafter as "cameraman") operates a video camera unit 1 by means of an operation unit 1, the video camera unit 1 is controlled by a control signal supplied to the video camera unit 1 through a connector 2 from a system controller 8. When an operation for controlling the VTR unit, such as record, playback, rewind, fast forward or the like, is designated by the operation unit 1, the system controller 8 supplies a control signal to a microcomputer 16 and a tape transport 11 is controlled by the microcomputer 16. Under the above-mentioned control operation, the cameraman can take a picture of an object or record a video signal obtained when the cameraman takes a picture of the object on the magnetic tape by the single-unit video camera-recorder.

Upon recording, the video signal obtained when the cameraman takes a picture of the object by the video camera unit 1 is processed in various manners, such as automatic gain adjustment, white balance adjustment, black balance adjustment, switching of electronic shutter speed or the like, by operating the operation unit 9. Then, the video signal thus processed is supplied through a connector 2 to a video signal input processing unit 3, in which it is pre-processed for recording and supplied to a recording signal processing unit 4. The video signal supplied to the recording signal processing unit 4 is processed in various manners so that it can be recorded on a recording medium.

An audio signal collected by a microphone 5 is supplied through a connector 6 to an audio signal input processing unit 7, in which it is pre-processed for recording and then supplied to the recording signal processing unit 4. Then, the audio signal is processed in various manners for recording together with the video signal. The audio signal thus processed is supplied through an amplifying circuit 10 and a rotary transformer 12 to a head 14 mounted on a rotary drum 13 together with the video signal, thereby being recorded on a magnetic tape (not shown) with the head 14 so as to form slant tracks.

Various types of single-unit video camera-recorders are now commercially available on the market, and any of these single-unit video camera-recorders includes the single tape transport.

Because the single-unit video camera-recorder records a video signal on a recording medium, if a remaining amount of the recording medium is lost, it is then necessary for the cameraman to set a new recording medium in the single-unit video-camera recorder.

Regardless of amateur or professional, the cameraman does not wish to interrupt the shooting whenever the cameraman encounters with a shutter release opportunity for taking an important picture (e.g., when valuable animals appeared, etc.). If the cameraman were required to change the recording medium with a new one even when the cameraman encountered with the shutter release opportunity, the cameraman would lose such important shutter release opportunity.

When the cameraman is taking a picture during a long time by using the single-unit video camera-recorder, the cameraman must set a new video tape cassette after the remaining amount of the video tape cassette provided as a recording medium is lost. Consequently, it is unavoidable that the cameraman suffers from a loss produced when taking a picture. Also, there is then the possibility that the cameraman will miss the important shutter release opportunity.

Further, even though the remaining amount of the recording medium is sufficient and the cameraman can take a picture satisfactorily, there is the possibility that a picture cannot be recorded on the recording medium due to a failure of the tape transport or the like.

SUMMARY OF THE INVENTION

In view of the aforesaid aspects, it is an object of the present invention to provide a single-unit video camera-recording apparatus and a recording apparatus in which, when a long-time recording is carried out, the recording can be prevented from being interrupted and the recording can be carried out with ease and in which a desired event to be recorded can be recorded reliably.

According to a first aspect of the present invention, there is provided an information signal recording apparatus which is comprised of first and second record devices for removably accommodating a recording medium and for recording the information signal to the recording medium, each of the first and second recording devices having first and second remaining amount detecting devices for detecting a remaining amount of the recording medium, respectively, and a control circuit for controlling the first and second record devices so that the first and second record devices are selectively placed in a recording operation mode and a recording disabled mode, in which the control circuit places the second record device in said recording operation mode during the first recording device is operated in the recording operation mode when the first remaining amount detecting device detects that a remaining amount of the recording medium is a predetermined value or smaller.

According to a second aspect of the present invention, there is provided an information signal recording apparatus which is comprised of a plurality of record devices, each for removably accommodating a recording medium and for recording the information signal to the recording medium, each of the plurality of recording devices having remaining amount detecting devices for detecting a remaining amount of the recording medium, respectively, and a control circuit for controlling the plurality of record devices so that the plurality of record devices are selectively placed in a recording operation mode and a recording disabled mode, in which the control circuit places another of the plurality of record devices in the recording operation mode during one of the plurality of record devices is operated in the recording operation mode when corresponding remaining amount detecting device detects that a remaining amount of the recording medium is a predetermined value or smaller.

DETAILED DESCRIPTION OF THE PREFERRED EMBODIMENT

A single-unit video camera-recording apparatus and a recording apparatus according to an embodiment of the present invention will now be described in detail with reference to the drawings.

Figure 1:
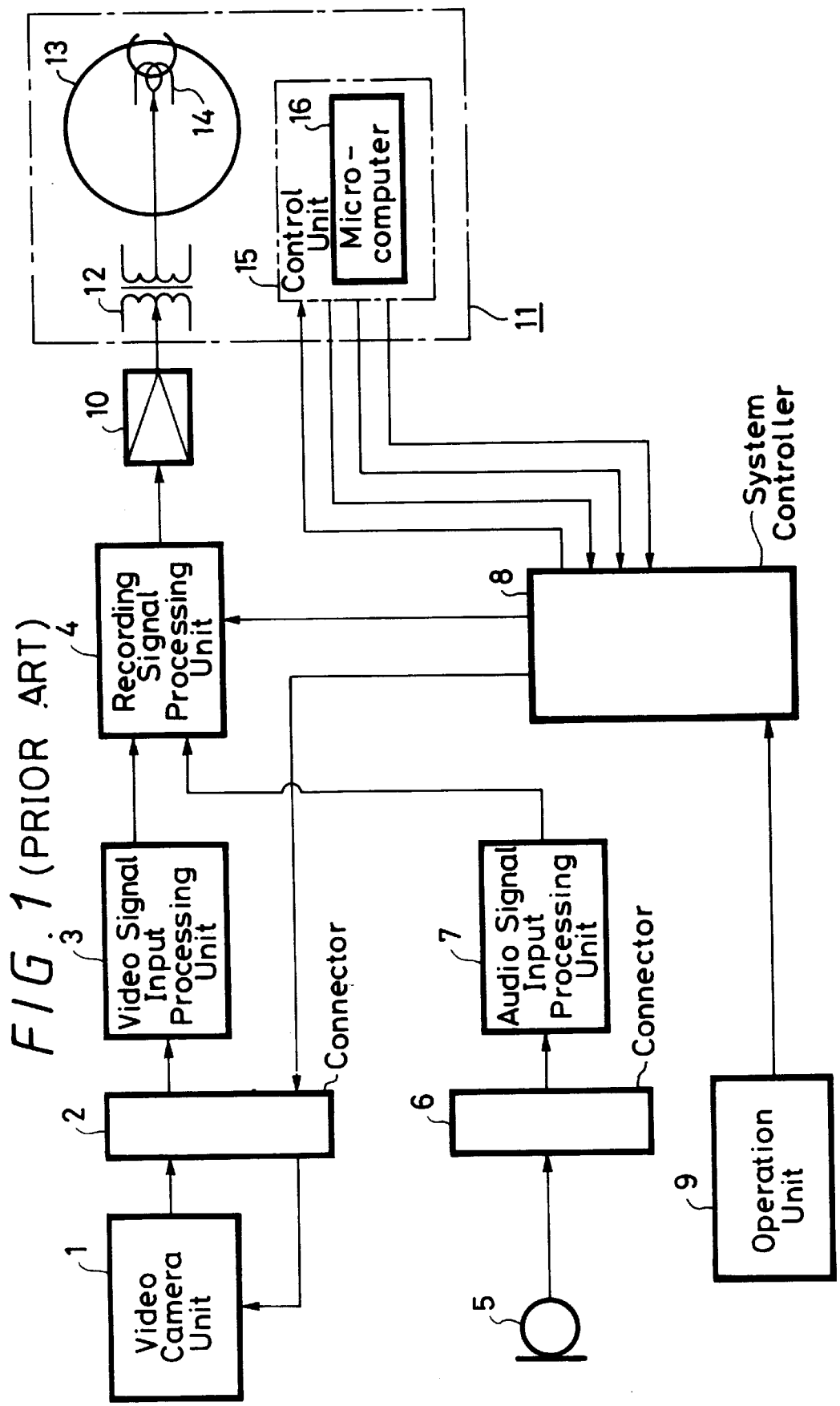
FIG. 1 is a block diagram showing an example of a conventional single-unit video camera-recorder.
Figure 2:
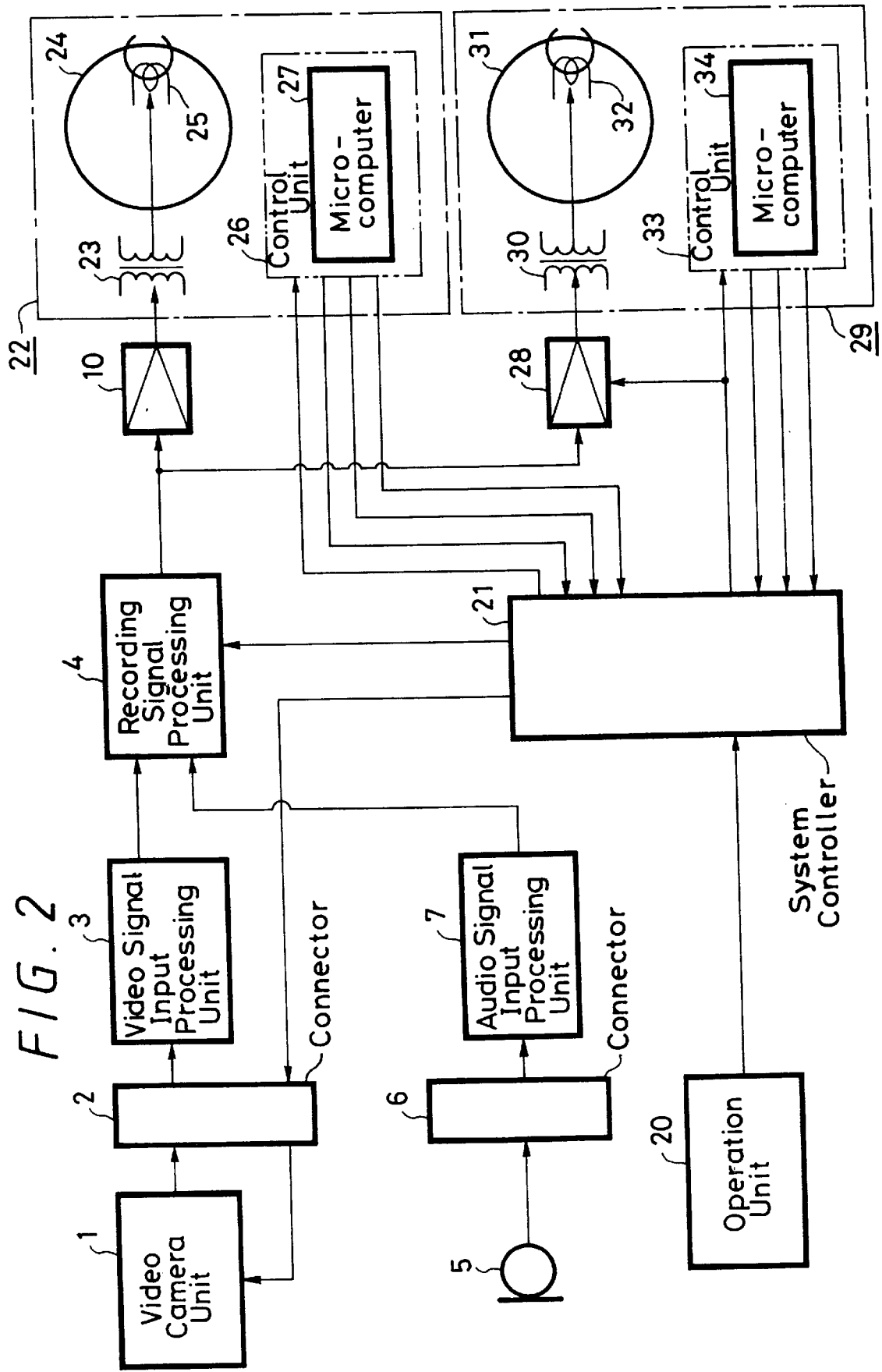
FIG. 2 is a block diagram showing a single-unit video camera-recording apparatus and a recording apparatus according to an embodiment of the present invention.

FIG. 2 shows an arrangement of a single-unit video camera-recording apparatus according to the present invention in which a VTR is used as a recording apparatus. The present invention will be described below with reference to FIG. 2. In FIG. 2, like parts corresponding to those of FIG. 1 are marked with the same references and therefore need not be described in detail.

As shown in FIG. 2, as is conventional, the video camera unit 1 includes an optical system and a signal processing system to effect a variety of adjustments, such as automatic gain adjustment, white balance adjustment, black balance adjustment, gamma-correction, switching of electronic shutter speed or the like. The above-mentioned adjustments can be made by supplying a control signal through the connector 2 to the video camera unit 1 from a system controller 21, which will be described later on, when the cameraman designates the adjustment by operating the operation unit 20 which includes various operation keys (not shown).

A video signal from the video camera unit 1 is processed in various manners by the video signal input processing unit 3 and then fed to the recording signal processing unit 4. If the recording format of the single-unit video camera-recorder shown in FIG. 2 is a digital format, such as a format used in a digital Betacam (registered trademark) VTR or the like, the video signal is processed in a variable length coding, such as DCT (discrete cosine transform), quantization, run length coding and Huffman coding and addition of various error correction codes. If the above-mentioned recording format is an analog format, then the video signal is processed in various manners of normal analog VTRs, such as de-emphasis or the like.

Sounds are collected by the microphone 5 and an audio signal from the microphone 5 is supplied to the audio signal input processing unit 7, in which it is processed in various signal processing manners and supplied to the recording signal processing unit 4.

The recording signal processing unit 4 can produce a recording signal by effecting various recording signal processings, such as modulation or the like, on the video signal from the video signal input processing unit 3 and the audio signal from the audio signal input processing unit 7. The recording signal processing unit 4 supplies the resultant recording signal through amplifying circuits 10 and 28 to tape transports 22 and 29.

The tape transports 22 and 29 will be described below. As shown in FIG. 2, the tape transport 22 is comprised of a rotary transformer 23, a rotary drum 24 having a magnetic head 25 mounted thereon and a control unit 26 including a microcomputer 27 to drive mechanical portions (not shown) and a rotary drum 24.

The tape transport 29 is comprised of a rotary transformer 30, a rotary drum 31 having a magnetic head 32 mounted thereon and a control unit 33 including a microcomputer 34 to drive mechanical portions (not shown) and the rotary drum 31.

Each of the tape transports 22 and 29 includes at its mechanical portion a sensor formed of some suitable devices, such as an LED (light emitting diode) and a photo-transistor, though not shown. Each of the tape transports 22 and 29 can detect by this sensor whether or not the mechanical portion is operated normally and can detect by the sensor or its mechanism whether or not a video tape cassette is set in the tape transport.

Each of the microcomputers 27 and 34 of the tape transports 22 and 29 carries out a self-diagnosis by a control signal supplied thereto from the system controller 21 in response to a sensor output from the sensor of the mechanical portion. The aforesaid control signal may be included in a recording control signal which will be described later on or may be supplied thereto as other signal.

Specifically, the single-unit video camera-recorder shown in FIG. 2 includes the two tape transports 22 and 29 and can effect the recording on the video tapes of the video tape cassettes set on the tape transports 22 and 29 in accordance with some modes which will be described later on. While the single-unit video camera-recorder of the present invention includes the two tape transports from a size and cost standpoint of the single-unit video camera-recorder, the present invention is not limited thereto and may include three or four tape transports so long as the problems of size and cost are solved.

The single-unit video camera-recorder can afford a recording mode in which the same video signal is recorded on the video tapes of the video tape cassettes set on the two tape transports 22 and 29 at the same time and a recording mode in which the recording is effected on the video tape of the video tape cassette set in either the tape transport 22 or 29 when the remaining amount of the video tape of the video tape cassette set in one of the tape transports 22 and 29 is lost. The latter mode includes a mode (referred to hereinafter as "one-time completion mode") in which the recording is completed when the recording on both of the video tapes of the video tape cassettes set on the two tape transports 22, 29 is completed, a mode (referred to hereinafter as "plural-times completion mode") in which the recording is sequentially carried out on the video tapes of the video tape cassettes set in the two tape transports 22, 29 until a time or number reaches a predetermined time or number, and a mode (referred to hereinafter as "continuous mode") in which the recording is continuously carried out on the video tapes of the video tape cassettes set on the two tape transports 22, 29 many times until the cameraman supplies a recording stop command by operating the operation unit 20.

The system controller 21 shown in FIG. 2 sets various modes on the basis of the operation of the operation unit 20 and also controls the tape transports 22 and 29 on the basis of various outputs from the control unit 26 or 33.

An example of the inside arrangement of the system controller 21 shown in FIG. 2 will be described below with reference to FIG. 3.

Figure 3:
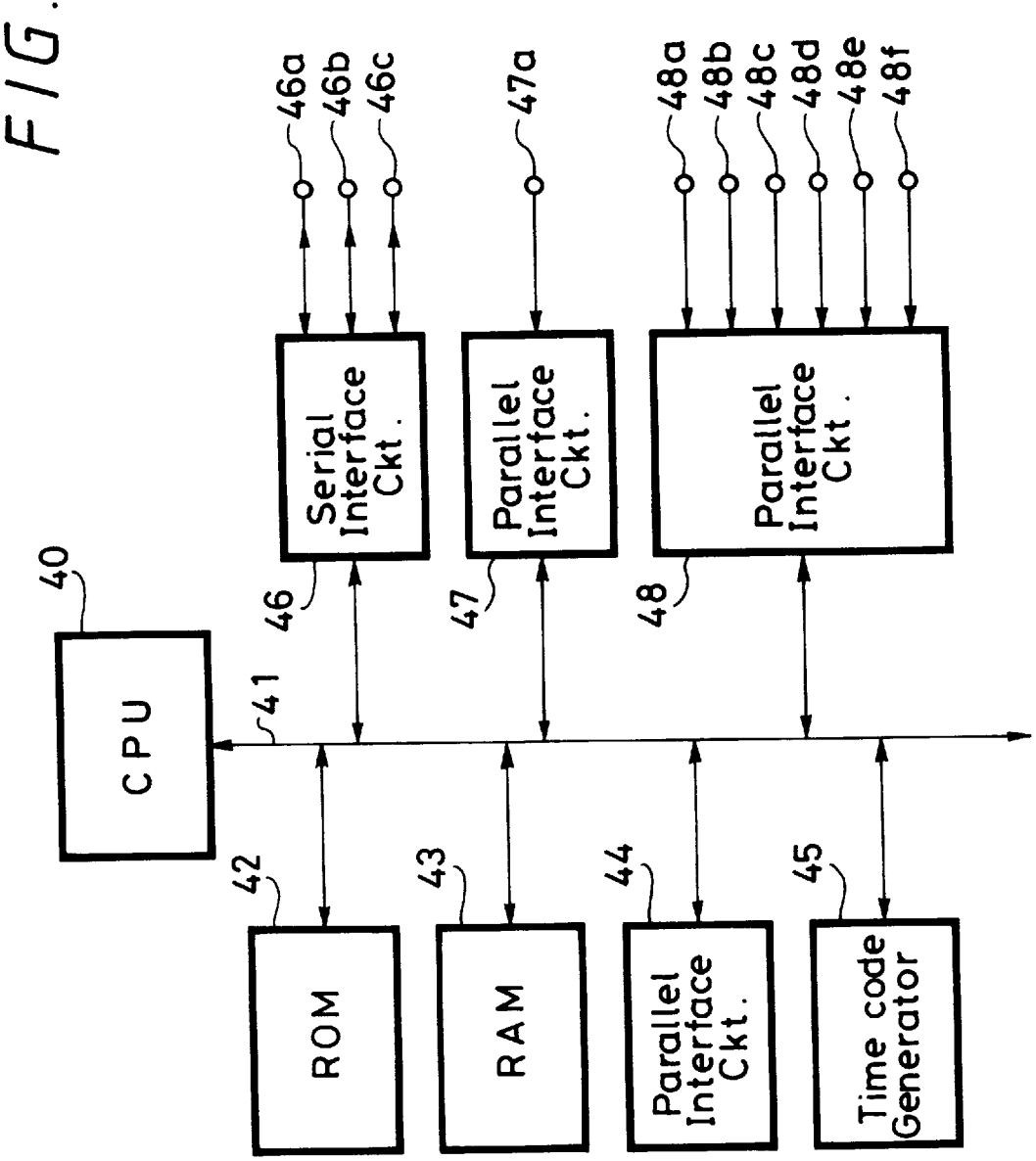
FIG. 3 is a block diagram showing a main portion, i.e., a system controller of the single-unit video camera-recording apparatus and the recording apparatus shown in FIG. 1.

In this example, as shown in FIG. 3, in the system controller 21, a bus (formed of address bus, data bus and control bus) 41 is connected to a CPU (central processing unit) 40. To the bus 41 are connected a ROM (read-only memory) 42 in which program data for effecting various controls in various modes are stored, a RAM (random access memory) 43 serving as a work area of the program data memorized in the ROM 42, a parallel interface circuit 44 for inputting a signal from the operation unit 20 shown in FIG. 2, a time code generator 45 for generating a time code, a serial interface circuit 46, a parallel interface circuit 47 and a parallel interface circuit 48.

The serial interface circuit 46 supplies a video signal Vp including display information (e.g., a variety of informations displayed on a viewfinder (not shown) of the video camera unit 1) through an input and output terminal 46a to the video camera unit 1. Moreover, the serial interface circuit 46 supplies a recording control signal P1 through an input and output terminal 46b to the tape transport 22 shown in FIG. 2, and also supplies a recording control signal P2 through an input and output terminal 46c to the tape transport 29 shown in FIG. 2.

The parallel interface circuit 47 supplies added information P3, such as a time code or the like, generated from the time code generator 45 through an input terminal 47a to the recording signal processing circuit 4 shown in FIG. 2. The parallel interface circuit 48 is supplied with tape insertion information Da1, tape insertion information Da2, operation alarm information Da3, tape insertion information Db1, tape insertion information Db2 and operation alarm information Db3.

An example of an arrangement for detecting a tape remaining amount of the video tape and a method of detecting a tape remaining amount of the video tape will be described with reference to FIG. 4.

Figure 4:
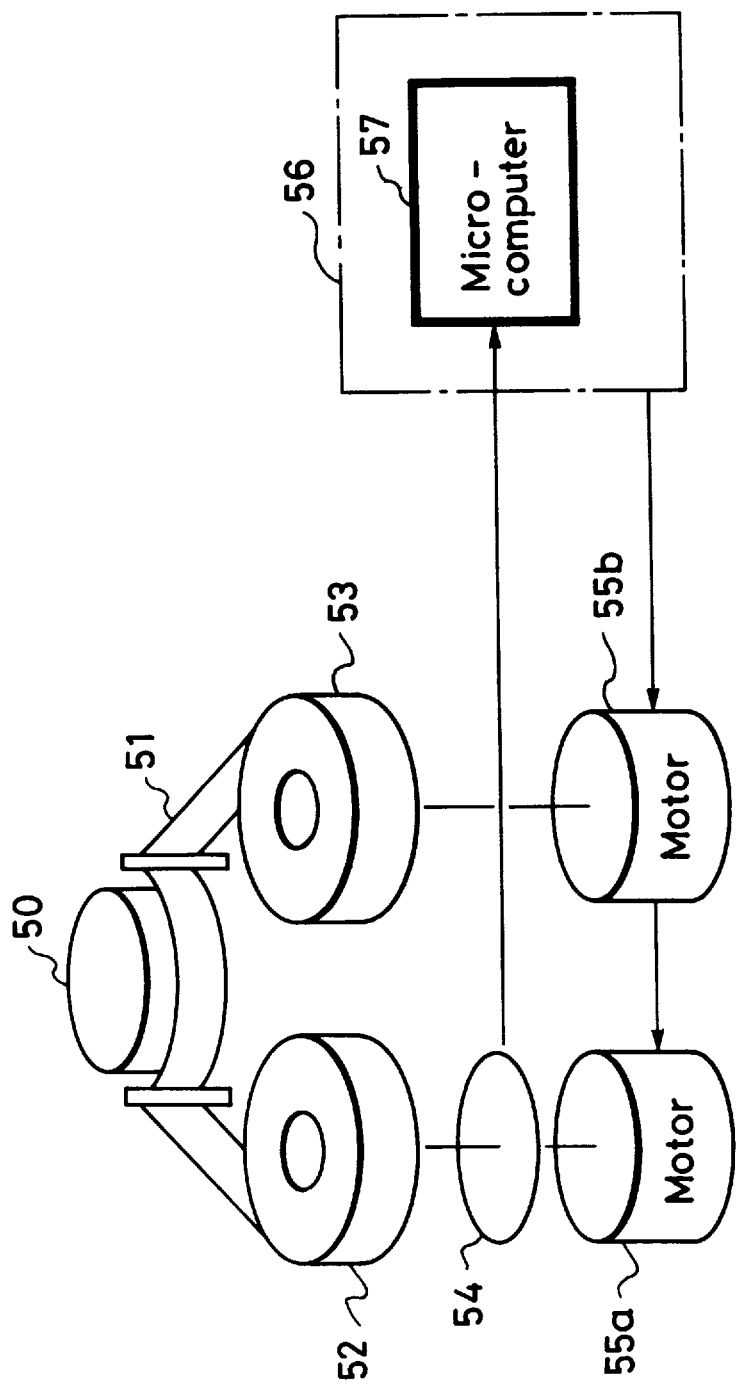
FIG. 4 is a diagram showing an arrangement of a tape remaining amount detecting mechanism, and to which reference will be made in explaining how to detect a tape remaining amount.

Referring to FIG. 4, there is provided a rotary drum 50 on which there is mounted a magnetic head (not shown). As shown in FIG. 4, according to this embodiment, a magnetic tape 51 supplied from a supply reel 52 of the video tape cassette is rewound about a take-up reel 53 and is wrapped around the rotary drum 50.

A shaft of a motor 55a for rotating the supply reel 52 is connected to the supply reel 52 through a frequency generator (FG) 54. A shaft of the motor 55b for rotating the take-up reel 53 is connected to the take-up reel 53. An output terminal of the frequency generator 54 is connected to an input terminal of a control unit (corresponding to the control unit 26 or 33 in FIG. 2, for example) 56 having a microcomputer 57. An output terminal of the control unit 56 is connected to a power supply input terminal of the motor 55a.

With the above-mentioned arrangement, the microcomputer 57 calculates the tape remaining amount of the video tape on the basis of a frequency signal representing a rotary frequency of the supply reel 52.

Let it be assumed that v is a tape speed, DO is a diameter of a hub of the supply reel 52, t is a thickness of the magnetic tape 51 and that L is a length of the magnetic tape 51 remaining in the supply reel 52. Then, a rotary period Ts of the supply reel 52 side can be expressed by the following equation (1):

$$Ts = \pi/v \, (D0^2 + 4Lt/\pi)^{1/2} \qquad (1)$$

Accordingly, the tape remaining amount, i.e., a remaining recordable time L/v can be calculated on the basis of the following equation (2) from the equation (1):

$$L/v = v/4\pi t \, (Ts^2 - \pi^2 D0^2 v^2) \qquad (2)$$

Specifically, it is possible to detect the tape remaining amount by calculating the rotary period Ts on the basis of the output from the frequency generator 54.

The remaining amount information (remaining recordable time) of the magnetic tape 51 obtained by the microcomputer 57 is supplied to the system controller 21 when the control unit 56 is the control unit 26 or 33 shown in FIG. 2. When the arrangement shown in FIG. 4 is made corresponding to that shown in FIG. 3, the tape remaining amount in the tape transport 22 shown in FIG. 2 becomes the tape remaining information Da2 shown in FIG. 3, and the tape remaining amount in the tape transport 29 becomes the tape remaining information Db2 shown in FIG. 3.

The self-diagnosis processing and an arrangement for effecting the self-diagnosis processing will be described below with reference to FIG. 5.

Figure 5:
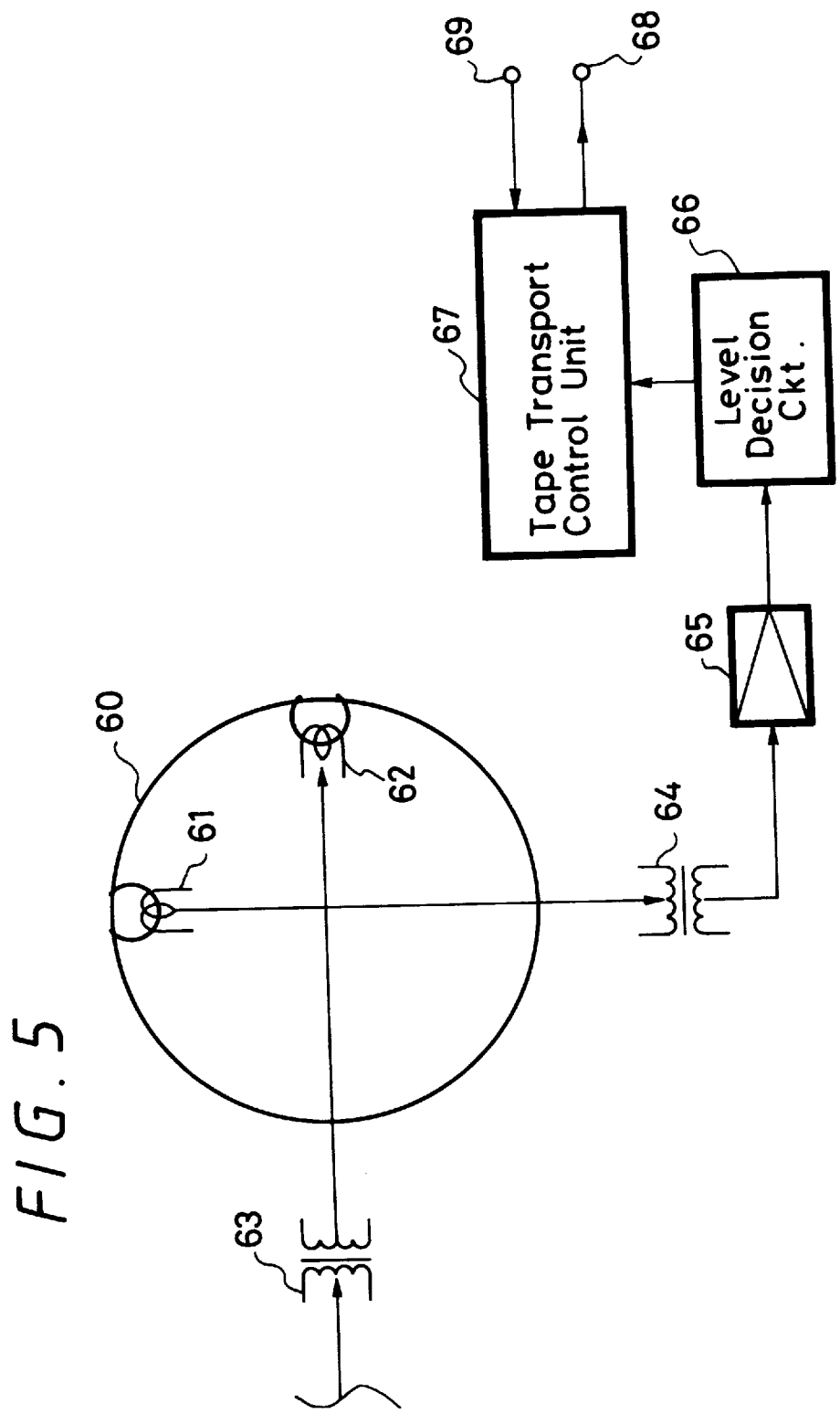
FIG. 5 is a diagram showing an arrangement of a self-diagnosis mechanism used in the present invention.

As shown in FIG. 5, there is provided a rotary drum 60 on which a recording and reproducing magnetic head 62 is mounted. Further, a self-diagnosis magnetic head (reproducing head) 61 for reproducing a magnetic track recorded by the magnetic head 62 is disposed on the rotary drum 60 at its position distant from the magnetic head 62 by a predetermined angular extent.

Upon recording, the magnetic head 62 is supplied with a recording signal from a recording system (amplifying circuits 10 and 28 in FIG. 2) of the VTR body circuit (not shown) through a rotary transformer 63. Thus, the magnetic head 62 records the recording signal on the magnetic tape (not shown) so as to form slant tracks on the recording surface of the magnetic tape. Upon self-diagnosis processing, the magnetic head 62 is supplied with a recording signal for self-diagnosis from the recording system shown in FIG. 2.

The magnetic head 61 reproduces the recorded recording signal by tracing the slant tracks recorded by the magnetic head 62 after the scanning of the magnetic head 62. A reproduced signal from the magnetic tape by the magnetic head 61 is supplied through a rotary transformer 64 and an amplifying circuit 65 to a level decision circuit 66. The level decision circuit 66 determines whether the level of the reproduced signal supplied thereto from the magnetic head 61 through the rotary transformer 64 and the amplifying circuit 65 is higher than a predetermined level or not. Then, the level decision circuit 66 supplies a decided result to a tape transport control unit 67.

The tape transport control unit 67 determines on the basis of the decided result of the level decision circuit 66 whether or not the recording is carried out normally. Then, the tape transport control unit 67 stores a decided result in a memory (RAM, register or the like) not shown. When the self-diagnosis control signal supplied thereto from the system controller 21 shown in FIG. 2 through the input terminal 69 becomes active, the tape transport control unit 67 supplies the decided result memorized in the memory (not shown) to the system controller 21 shown in FIG. 2 through an output terminal 68. It is possible that the decided result is transmitted only when an abnormality in the recording occurs.

The amplifying circuit 65, the level decision circuit 66 and the tape transport control unit 67 shown in FIG. 5 correspond to the control units 26 and 33 shown in FIG. 2. Accordingly, the self-diagnosis control signal supplied to the input terminal 69 shown in FIG. 5 is included in the recording control signals P1, P2 output from the input and output terminals 46b, 46c or the self-diagnosis control signal is output from the input and output terminals 46a, 46b independently. The decided result output from the output terminal 68 shown in FIG. 5 corresponds to the operation alarm informations Da3, Db3 supplied to the input terminals 48c, 48f in FIG. 3.

The operation alarm informations Da3 and Db3 include not only the decided result of the self-diagnosis mode but also information representing whether or not the video tape cassette is set in the tape transport and information representing an abnormality detected by a mechanical unit (not shown) of the tape transports 22, 29 shown in FIG. 2. The operation alarm informations Da3, Db3 are supplied through the parallel interface circuit 48 shown in FIG. 3 and the connector 2 to the viewfinder (not shown) of the video camera unit 1, thereby being displayed on a picture within the viewfinder as an alarm picture.

Operation of the single-unit video camera-recorder according to the present invention shown in FIGS. 2 to 5, particularly, operation based on various modes will be described below with reference to FIGS. 6 to 15.

Initially, operation of the single-unit video camera-recorder according to the present invention will be described with reference to FIGS. 6 and 7.

Figure 6:
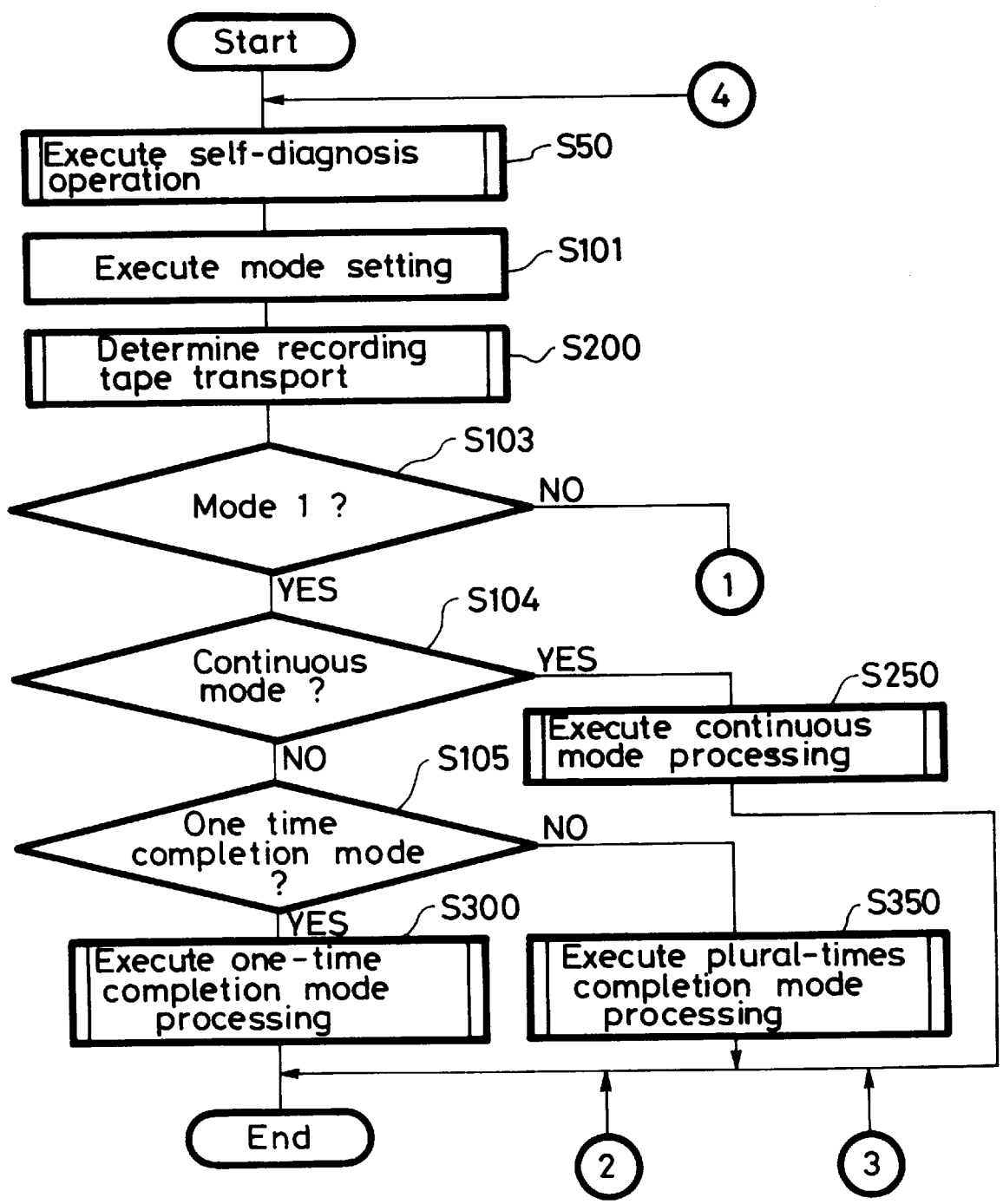
FIGS. 6 through 15 are flowcharts to which reference will be made in explaining operation of the single-unit video camera-recording apparatus and the recording apparatus according to the present invention, respectively.

Referring to FIG. 6, following the start of operation, a self-diagnosis operation is executed at step S50, and the processing proceeds to the next step S101.

A mode setting is executed at step S101. The mode setting means which mode the cameraman designates from various modes by operating the operation unit 20 shown in FIG. 2. Also, the mode setting means that the mode is determined in accordance with a pre-determined condition when the mode is not designated by the cameraman.

The recording tape transport is determined in step S200. To determine the recording tape transport means which of the two tape transports 22 and 29 shown in FIG. 2 the cameraman designates by using the operation unit 20 shown in FIG. 2. When the cameraman does not designate the tape transport, the recording tape transport 22 or 29 is determined in accordance with a pre-determined condition.

It is determined in decision step S103 whether or not the mode is the mode 1. If a YES is output at decision step S103, then the processing proceeds to the next decision step S104. If a NO is output at decision step S103, then the processing proceeds to the next decision step S106 of a flowchart forming FIG. 7. In the mode 1, when the tape remaining amount of the video tape cassette set in the tape transport 22 or 29 which is set in the recording operation mode is smaller than a certain set value, the other tape transport 29 or 22 is automatically set in the recording operation mode, and the recording is effected on the video tape of the video tape cassette set in the tape transport 29 or 22. This mode 1 further includes a plurality of modes, i.e., the one-time completion mode, the plural-times completion mode and the continuous mode.

According to the mode 2, one of the tape transports 22 and 29 is selected and the recording signal is recorded on the video tape of the video tape cassette set in selected one of the tape transports 22 and 29. According to the mode 3, the recording signal is simultaneously recorded on the video tapes of the video tape cassettes set in the tape transports 22 and 29.

It is determined in decision step S104 whether or not the mode is the continuous mode. If a YES is output at decision step S104, then the processing proceeds to step S250. If on the other hand a NO is output at decision step S104, then the processing proceeds to the next decision step S105.

It is determined in decision step S105 whether or not the mode is the one-time completion mode. If a YES is output at decision step S105, then the processing proceeds to step S300. If on the other hand a NO is output at decision step S105, then the processing proceeds to step S350.

In step S250, the continuous mode processing is executed. The continuous mode means the continuous mode of the above-mentioned mode 1.

In step S300, the one-time completion mode processing is executed.

In step S350, the plural-times completion mode processing is executed. The plural-times completion mode means the plural-times completion mode of the above-mentioned mode 1.

Figure 7:
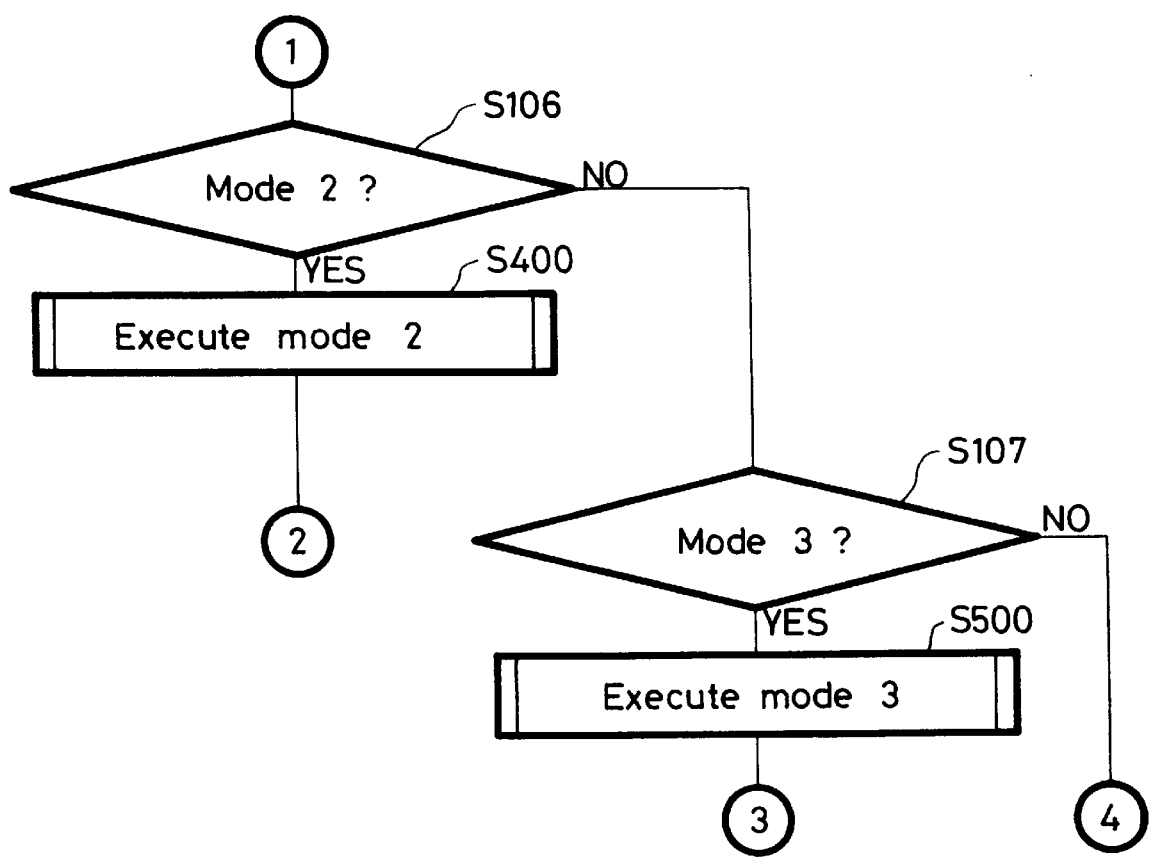

Referring to FIG. 7, it is determined in decision step S106 whether or not the mode is the mode 2. If a YES is output at decision step S106, then the processing proceeds to step S400. If on the other hand a NO is output at decision step S106, then the processing proceeds to the next decision step S107.

In step S400, the mode 2 is executed.

It is determined in decision step S107 whether or not the mode is the mode 3. If a YES is output at decision step S107, then the processing proceeds to step S500. If on the other hand a NO is output at decision step S107, then the processing returns to step S50 of the flowchart forming FIG. 6.

In step S500, the mode 3 is executed.

Self-diagnosis operation at step S50 in the flowchart forming FIG. 6 will be described with reference to FIG. 8.

Figure 8:
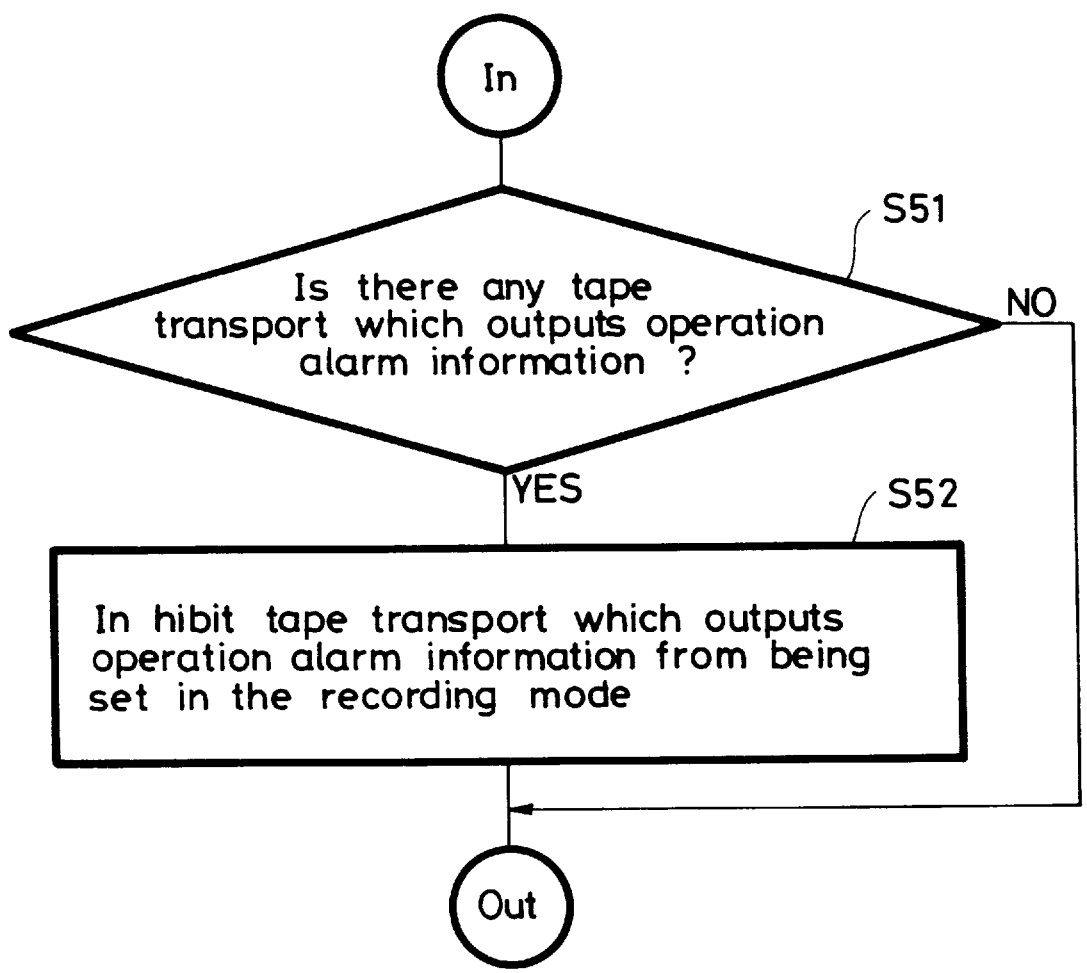

Referring to FIG. 8, it is determined in decision step S51 whether or not there is the tape transport which outputs the operation alarm information. If a YES is output at decision step S51, then the processing proceeds to step S52. If on the other hand a NO is output at decision step S51, then the processing is ended. Specifically, a detected output from the sensor (not shown) of the above-mentioned mechanical portion is supplied to the control units 26 and 33 of the tape transports 22 and 29, whereby the control units 26 and 33 perform the failure diagnosis. If the control units 26 and 33 determine that the tape transports 22 and 29 are out of order, then the tape transports 22 and 29 output the operation alarm informations Da3 and Db3. The operation alarm informations Da3 and Db3 from the tape transports 22 and 29 are supplied to the system controller 21. To be more concrete, the operation alarm informations Da3 and Db3 are supplied through the input terminals 48c and 48f shown in FIG. 3 to the parallel interface circuit 48, and further supplied through the parallel interface circuit 48 and the bus 41 to the CPU 40.

In step S52, the tape transport which outputs the operation alarm information is inhibited from being set in the recording mode. Specifically, when the operation alarm information Da3 or Db3 is supplied to the CPU 40, the CPU 40 recognizes the tape transport 22 or 29 which is out of order and inhibits the tape transport 22 or 29 from being set in the recording mode. Then, the processing returns from the routine shown in FIG. 8 to step S101 of the flowchart shown in FIG. 6.

Step S200 shown in FIG. 6 is executed in order to determine the tape transports 22 and 29 to be the recording use and will be described more in detail later on. When it is determined that the tape transport 22 designated by the cameraman, for example, is out of order, the tape transport 22 is inhibited from being set in the recording mode. Then, the tape transport 29 which is not recognized as the failure tape transport is forcibly set in the recording mode and also a message representing that the tape transport 22 cannot be designated is output. Further, when the tape transport 22 or 29 is not designated by the cameraman, the tape transport 29 which is not recognized as the failure tape transport is forcibly set in the recording mode and the message representing that the tape transport 22 cannot be designated by the cameraman, i.e., that the tape transport 22 is out of order is output.

Operation in step S200 in the flowchart shown in FIG. 6 for determining the recording tape transport 22 or 29 will be described with reference to FIG. 9.

Figure 9:
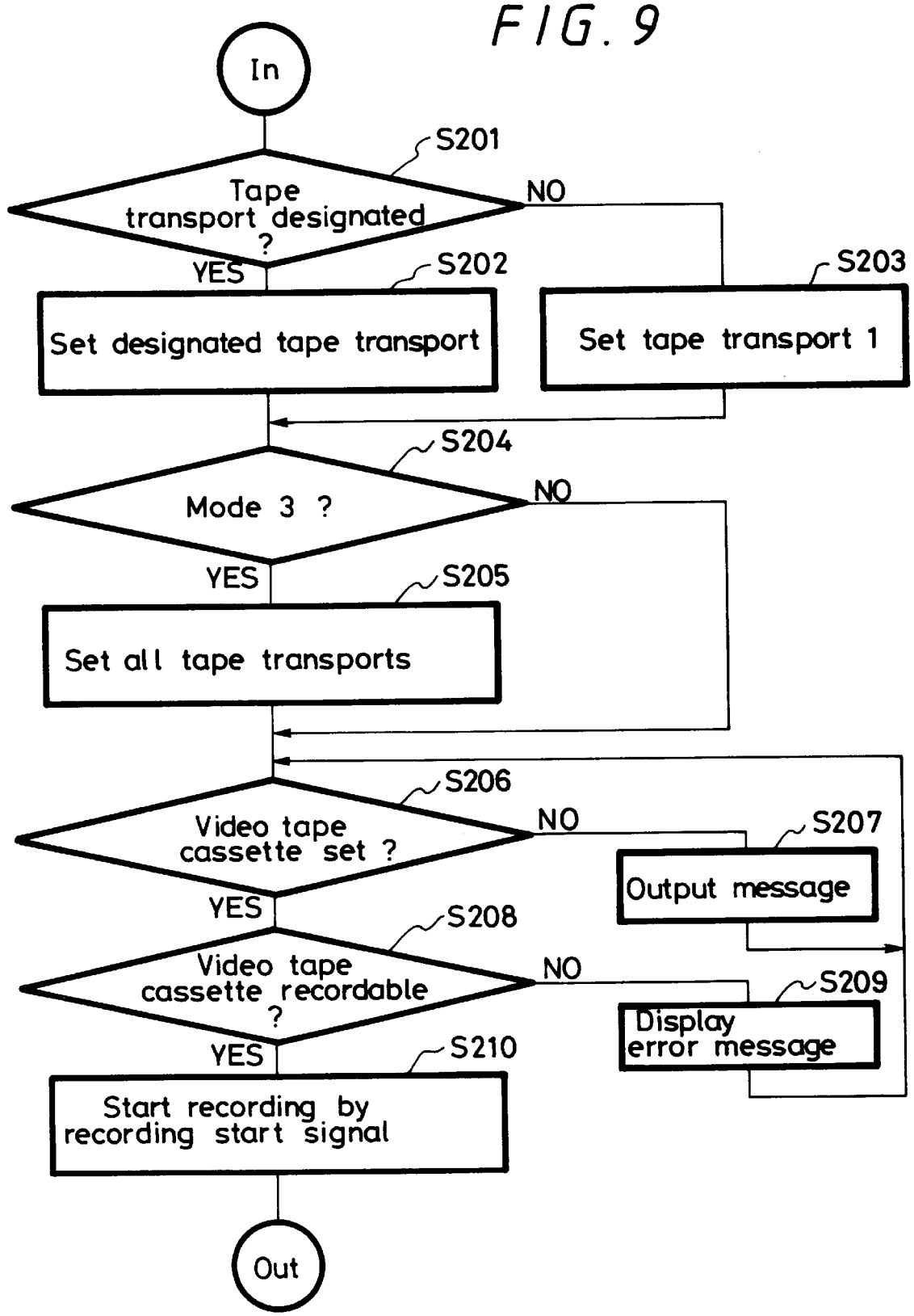

Referring to FIG. 9, it is determined in decision step S201 whether or not the tape transport is designated by the cameraman. Specifically, it is determined in decision step S201 whether or not the cameraman designates the recording tape transport 22 or 29 by operating the operation unit 20 shown in FIG. 2. The method for determining whether the tape transport is not designated is not limited to the above-mentioned method and the following variants are also possible. That is, it is determined that the tape transport is not designated when a predetermined time is elapsed in the designated mode; it is determined that the tape transport is not designated when the recording tape transport is not designated in the designate mode and the mode proceeds to the mode for effecting other designation; and it is determined that the tape transport is not designated when the completion is designated in the designated mode. If a YES is output at decision step S201, then the processing proceeds to step S202. If on the other hand a NO is output at decision step S201, then the processing proceeds to step S203.

In step S202, the tape transport is set in the designated tape transport. Specifically, the corresponding tape transport 22 or 29 is set in the recording tape transport in accordance with data designated by the cameraman through the operation unit 20 shown in FIG. 2. Then, the processing proceeds to step S204.

In step S203, the tape transport 1 is set, and the processing proceeds to step S204. The tape transport 1 means the tape transport 22 or 29 set as a default.

It is determined in the next decision step S204 whether or not the mode is the mode 3. That is, since the mode setting was already made in step 101 in the flowchart of FIG. 6, the setting mode set at that time is determined. If a YES is output at decision step S204, then the processing proceeds to step S205. If on the other hand a NO is output at decision step S204, then the processing proceeds to decision step S206.

In step S205, all the tape transports are set in the recording mode, i.e., the tape transports 22 and 29 are set in the recording mode. Then, the processing proceeds to step S206.

Step S204 for determining whether or not 3 might be executed at the first step in this flowchart of FIG. 9. In this case, since the tape transport 22 or 29 is designated after the mode 1 or 2 in which one of the tape transports 22 and 29 is used or the mode 3 in which the two tape transports 22 and 29 are used was determined, if it is determined that the mode is the mode 1 or 2, then it is determined whether or not the tape transport is designated. If it is determined that the mode is the mode 3, the two tape transports are set in the recording mode.

It is determined in decision step S206 whether or not the video tape cassette is set in the tape transport. That is, in step S206, an output of the sensor (not shown) for detecting the setting of the video tape cassette is judged. If a YES is output at decision step S206, then the processing proceeds to the next decision step S208. If on the other hand a NO is output at decision step S206, then the processing proceeds to step S207.

In step S207, a message is output, i.e., a message representing that the video tape cassette is not set is announced to the cameraman by superimposing message data upon a picture displayed on a display unit (not shown) or the viewfinder of the video camera unit 1 shown in FIG. 2. Then, the processing returns to step S206.

It is determined in decision step S208 whether or not the video tape of the video tape cassette can be recorded. Specifically, it is determined by sensing the position of a recording prevention member of the video tape cassette or the presence or absence of similar member whether the video tape of the video tape cassette can be recorded or not. If a YES is output at decision step S208, then the processing proceeds to step S210. If on the other hand a NO is output at decision step S208, then the processing proceeds to step S209.

In step S209, an error message is displayed, i.e., an error message representing that the video tape cassette that cannot be recorded is set in the tape transport is announced to the cameraman by superimposing a message upon a picture displayed on the display unit (not shown) or the viewfinder of the video camera unit 1 shown in FIG. 2. Then, the processing proceeds to step S206.

In step S210, the recording is started by the recording start signal, i.e., when the cameraman enters a recording start command by operating the operation unit 20 shown in FIG. 2, a recording signal from the recording signal processing unit 4 shown in FIG. 2 is recorded on the tape transport 22 or 29 determined as the recording tape transport. Then, the processing returns from the routine shown in FIG. 9 to the step S103 shown in FIG. 6.

Operation in the continuous mode of the mode 1 at step S250 in the flowchart of FIG. 6 will be described with reference to FIG. 10.

Figure 10:
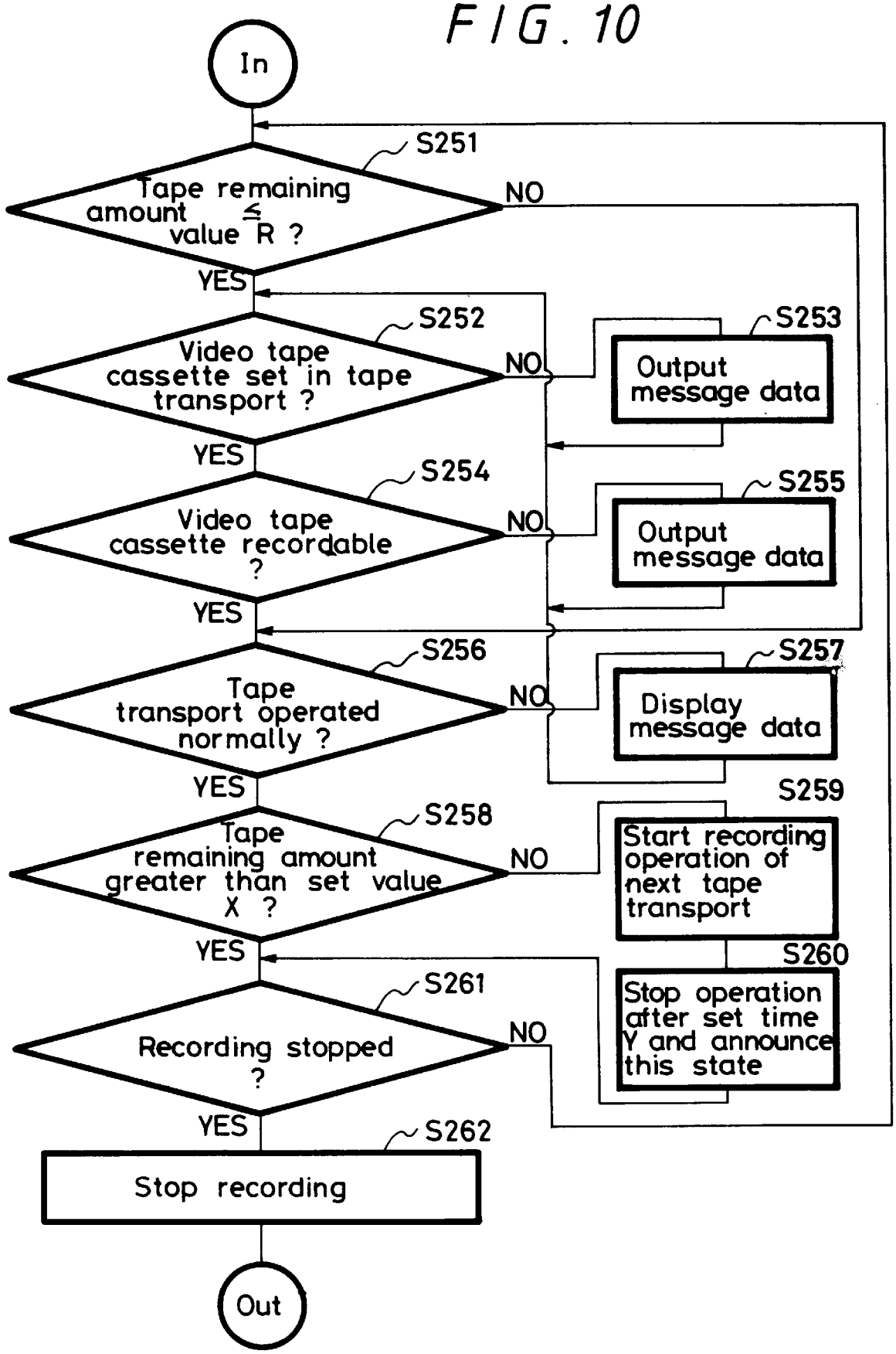

Referring to FIG. 10, it is determined in decision step S251 whether or not the tape remaining amount is less than a set value R. Specifically, a remaining amount (remaining recordable time) of the video tape of the video tape cassette is detected by the system shown in FIG. 4 and it is determined whether or not the remaining amount obtained as the detected result is the set value R or smaller. If a YES is output at decision step S251, then the processing proceeds to the next step S252. If on the other hand a NO is output at decision step S251, then the processing proceeds to step S253. The set value R might be set when the cameraman, for example, operates the operation unit 20 or previously stored in the ROM 42 shown in FIG. 3 as a default. In any cases, the value of the set value R should be determined in accordance with the specification of the apparatus. In this embodiment, the value of the set value R might be a value such that the remaining amount of the video tape of the video tape cassette becomes sufficient relative to a set value X, which will be described later on, when the cameraman prepares and sets the video tape cassette in the tape transport 22 or 29 (or tape transports 22 and 29).

It is determined in decision step S252 whether or not the video tape cassette is set in the tape transport. Specifically, the output of the sensor which detects the video tape cassette is judged. If a YES is output at decision step S252, then the processing proceeds to step S254. If on the other hand a NO is output at decision step S252, then the processing proceeds to step S255.

In step S253, message data is output, i.e., message data representing that the video tape cassette is not set in the tape transport is announced to the cameraman by superimposing message data upon a picture displayed on the display portion (not shown), i.e., the viewfinder of the video camera unit 1 shown in FIG. 2. Then, the processing returns to step S252.

It is determined in decision step S254 whether or not the video tape of the video tape cassette can be recorded. The method for determining whether or not the video tape of the video tape cassette can be recorded is similar to that of step S208. If a YES is output at decision step S254, then the processing proceeds to step S256. If on the other hand a NO is output at decision step S254, then the processing proceeds to step S255.

In step S255, message data is displayed, i.e., message data representing that the video tape of the video tape cassette thus set cannot be recorded is displayed on the display unit (not shown) or the viewfinder of the video camera unit 1 shown in FIG. 2. Then, the processing returns from step S255 to decision step S252.

It is determined in decision step S256 whether or not the tape transport is operated normally. Specifically, it is determined by detecting that the mechanical portion is operated normally by the sensor or the like similarly to the self-diagnosis operation described with reference to the flowchart of FIG. 8 whether or not the tape transport is operated normally. If a YES is output at decision step S256, then the processing proceeds to the next decision step S258. If on the other hand a NO is output at decision step S256, then the processing proceeds to step S257.

In step S257, message data is displayed, i.e., message data representing that the tape transport 22 or 29 or the tape transports 22 and 29 are in the failure state is displayed on the picture of the display portion (not shown) or the viewfinder of the video camera unit 1 shown in FIG. 2 similarly as described above. Then, the processing returns to step S252.

It is determined in decision step S258 whether or not the remaining amount of the video tape of the video tape cassette is the set value X or greater. The set value X might be set by the cameraman, for example, by operating the operation unit 20 or previously memorized in the ROM 2 shown in FIG. 3 as a default. In this embodiment, the value of the set value X is set to be several minutes before the last portion of the video tape of the video tape cassette. If a YES is output at decision step S258, then the processing proceeds to the next decision step S261. If on the other hand a NO is output at decision step S258, then the processing proceeds to step S259.

In step S259, the recording operation of the next tape transport is started. Specifically, the tape transport 29 or 22 is set in the recording operation state by supplying an automatic recording start control signal to the control unit 26 or 33 of the target tape transport 29 or 22.

In step S260, the tape transport 22 or 29 is stopped after the set time Y and this state is announced to the cameraman. Specifically, after the set time Y is elapsed, the recording operation of the tape transport 22 or 29 is stopped by supplying a stop control signal to the control unit 26 or 33 of the tape transport 22 or 29. Also, information representing that the recording operation of the tape transport 22 or 29 is stopped is output to the display unit (not shown) or the viewfinder of the video camera unit 1 shown in FIG. 2 to thereby announce this state to the cameraman. The set time Y is shorter than the set time X. The set time Y also might be set by the cameraman by operating the operation unit 20 or previously stored in the ROM 42 shown in FIG. 3 similarly to the set values R and X. When the stopped condition of the tape transport 22 or 29 is announced to the cameraman, the cameraman can understand the completion of the recording and urged to change the finished video tape cassette. Then, the processing proceeds to the next decision step S261.

It is determined in decision step S261 whether or not the recording is stopped. Specifically, it is determined whether or not the cameraman enters a recording stop command by means of the operation unit 20. If a YES is output at decision step S261, then the processing proceeds to step S262. If on the other hand a NO is output at decision step S261, then the processing returns to step S251.

In step S262, the recording is stopped. Then, the processing returns from the sub-routine shown in FIG. 10 to the program of the flowchart shown in FIG. 6, whereafter the processing is ended. More specifically, in the processing shown in FIG. 10, the recording is alternately and repeatedly carried out on the tape cassette set on the tape transport 22 or 29 so long as the cameraman does not enter the recording stop command by the operation unit 20. In the continuous mode, if the single-unit video camera-recorder of the present invention is combined with a so-called cart machine or the like in which the video tape cassette is automatically set to the VTR or the video tape cassette is automatically ejected from the VTR, then a full automatic continuous recording apparatus can be realized only by transmitting a command of the system controller 21 shown in FIG. 2 to this apparatus. Since this full automatic continuous recording apparatus can continuously carry out the recording (shooting and recording) of a time corresponding to the number of the previously-prepared video tape cassettes, it is possible to take a picture automatically under severe conditions, such as when the cameraman takes a picture of wild animals and a picture of various physical phenomena (e.g., when the cameraman takes a picture of an object that has substantially no possibility to be shot or when the cameraman takes a picture during a long time under severe weather condition or temperature condition).

Figure 11:
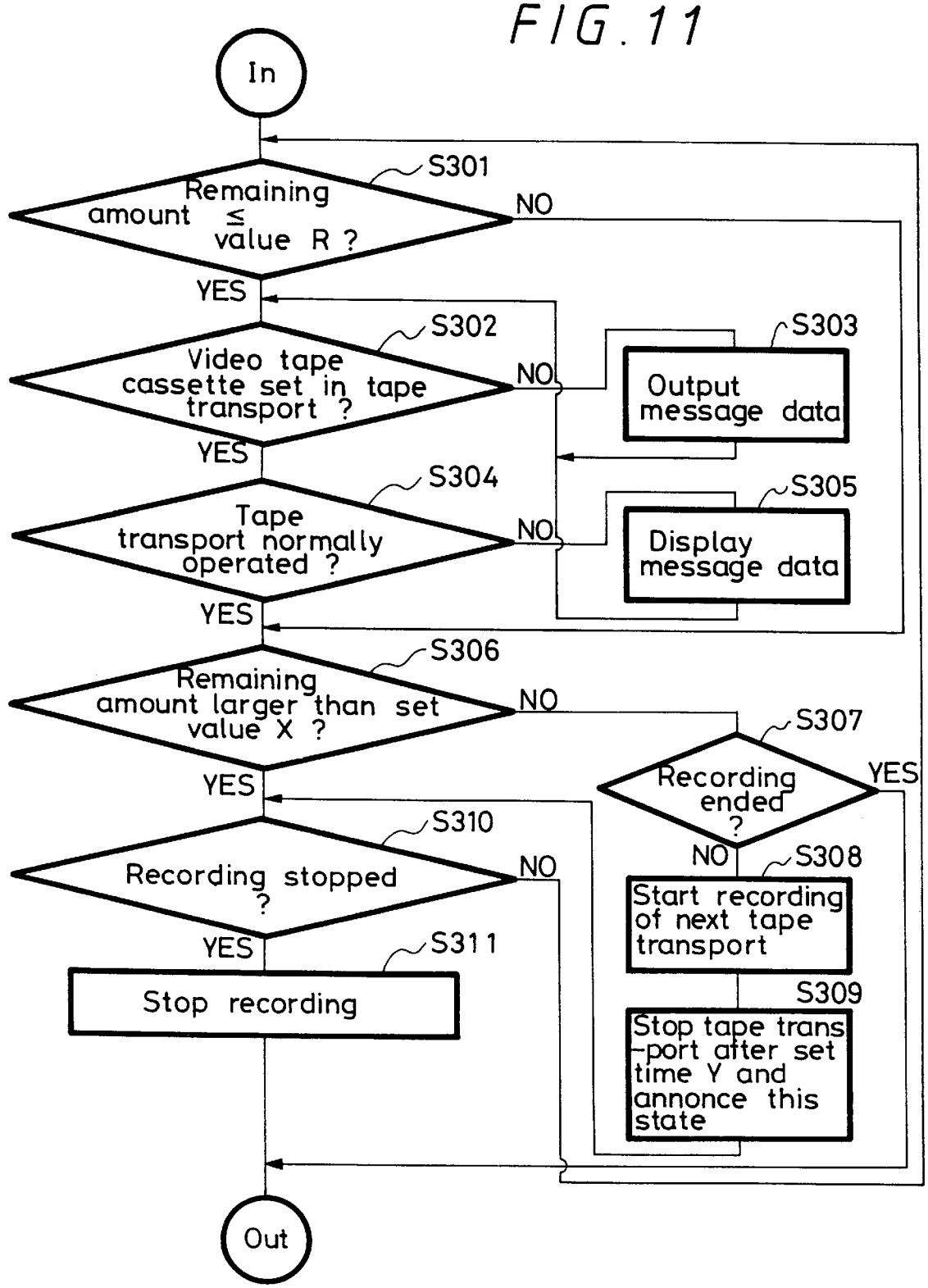

Operation of the one-time completion mode of the mode 1 at step S300 of the flowchart shown in FIG. 6 will be described with reference to FIG. 11.

It is determined in decision step S301 whether or not the remaining amount of the video tape of the video tape cassette is the set value R or smaller. Specifically, the remaining amount (remaining recordable time) of the video tape of the video tape cassette is detected by using the system shown in FIG. 4, and it is determined by using the detected result whether or not the resultant remaining tape amount is less than the set value R. If a YES is output at decision step S301, then the processing proceeds to the next decision step S302. If on the other hand a NO is output at decision step S301, then the processing proceeds to decision step S306.

It is determined in decision step S302 whether or not the video tape cassette is set in the tape transport. Specifically, the output of the sensor which detects the video tape cassette is judged. If a YES is output at decision step S302, then the processing proceeds to the next decision step S304. If on the other hand a NO is output at decision step S302, then the processing proceeds to step S303.

In step S303, message data is output, i.e., message representing that the video tape cassette is not set in the tape transport is announced to the cameraman by superimposing message data upon a picture displayed on the display portion (not shown) or the viewfinder of the video camera unit 1 shown in FIG. 2. Then, the processing returns to step S302.

It is determined in decision step S304 whether or not the tape transport is operated normally. Specifically, similarly to the failure diagnosis operation described with reference to FIG. 8, it is determined by detecting that the mechanical portion is operated normally by the sensor unit whether or not the transport 22 or 29 is operated normally. If a YES is output at decision step S304, then the processing proceeds to the next decision step S306. If on the other hand a NO is output at decision step S304, then the processing proceeds to step S305.

In step S305, message data is displayed, i.e., message representing that the tape transport 22 or 29 or the tape transports 22 and 29 are both in the failure state is displayed on the display portion (not shown) or the viewfinder of the video camera unit 1 shown in FIG. 2. Then, the processing returns to step S302.

It is determined in decision step S306 whether or not the remaining amount of the video tape of the video tape cassette is the set value X or greater. If a YES is output at decision step S306, then the processing proceeds to decision step S310. If on the other hand a NO is output at decision step S306, then the processing proceeds to the next decision step S307.

It is determined in decision step S307 whether or not the recording is ended, i.e., whether or not the tape transport 22 or 29 carried out the recording operation one time each. If a NO is output at decision step S307, then the processing proceeds to step S308. If on the other hand a YES is output at decision step S307, then the processing returns from this routine to the routine shown in FIG. 6. Specifically, since this routine is the one-time completion mode in which the tape transport 22 and 29 are each placed in the recording operation mode once, it is determined in decision step S307 whether or not both of the tape transports 22 and 29 have already carried out the recording operation. The method for determining whether or not both of the tape transports 22 and 29 have already carried out the recording is not limited to the above-mentioned method and the following variant also is possible. That is, it is possible to determine by confirming a flag indicative of the presence or absence of the recording set in a register (not shown) of the system controller 21 or the RAM 43 whether or not both the tape transports 22 and 29 have already carried out the recording.

In step S308, the recording of the next tape transport is started. Specifically, the tape transport 29 or 22 is placed in the recording operation state by supplying an automatic recording start control signal to the control unit 33 or 26 of the target tape transport 29 or 22. Then, the processing proceeds to step S309.

In step S309, the tape transport 22 or 29 is stopped after the set time Y and this is announced to the cameraman. Specifically, the recording operation of the tape transport 22 or 29 is stopped by supplying the control signal for stopping the recording operation of the tape transport 22 or 29 after the set time Y was elapsed to the control unit 26 or 33 of the tape transport 22 or 29. Also, information representing that the recording operation is stopped is output to the display portion (not shown) or the viewfinder of the video camera unit 1 shown in FIG. 2. The set time Y is the set time X or smaller. Further, the set time Y also might be set by the cameraman by operating the operation unit 20 or previously-stored in the ROM 42 shown in FIG. 3. Then, the processing returns from the routine shown in FIG. 11 to the routine of the flowchart shown in FIG. 6.

It is determined in decision step S310 whether or not the recording is stopped. Specifically, it is determined whether or not the cameraman enters the recording stop command by means of the operation unit 20. If a YES is output at decision step S310, then the processing proceeds to step S311. If on the other hand a NO is output at decision step S310, then the processing returns to step S301.

In step S311, the recording is stopped. Specifically, in the processing shown in FIG. 11, the recording is carried out on the video tape of the video tape cassette set in the tape transport 22 or 29 one time each so long as the cameraman does not enter the recording stop command by means of the operation unit 20. Then, the processing returns from the sub-routine shown in FIG. 11 to the program shown in the flowchart of FIG. 6.

Operation of the plural-times completion mode of the mode 1 at step S350 in the flowchart shown in FIG. 6 will be described with reference to FIGS. 12 and 13.

Figure 12:
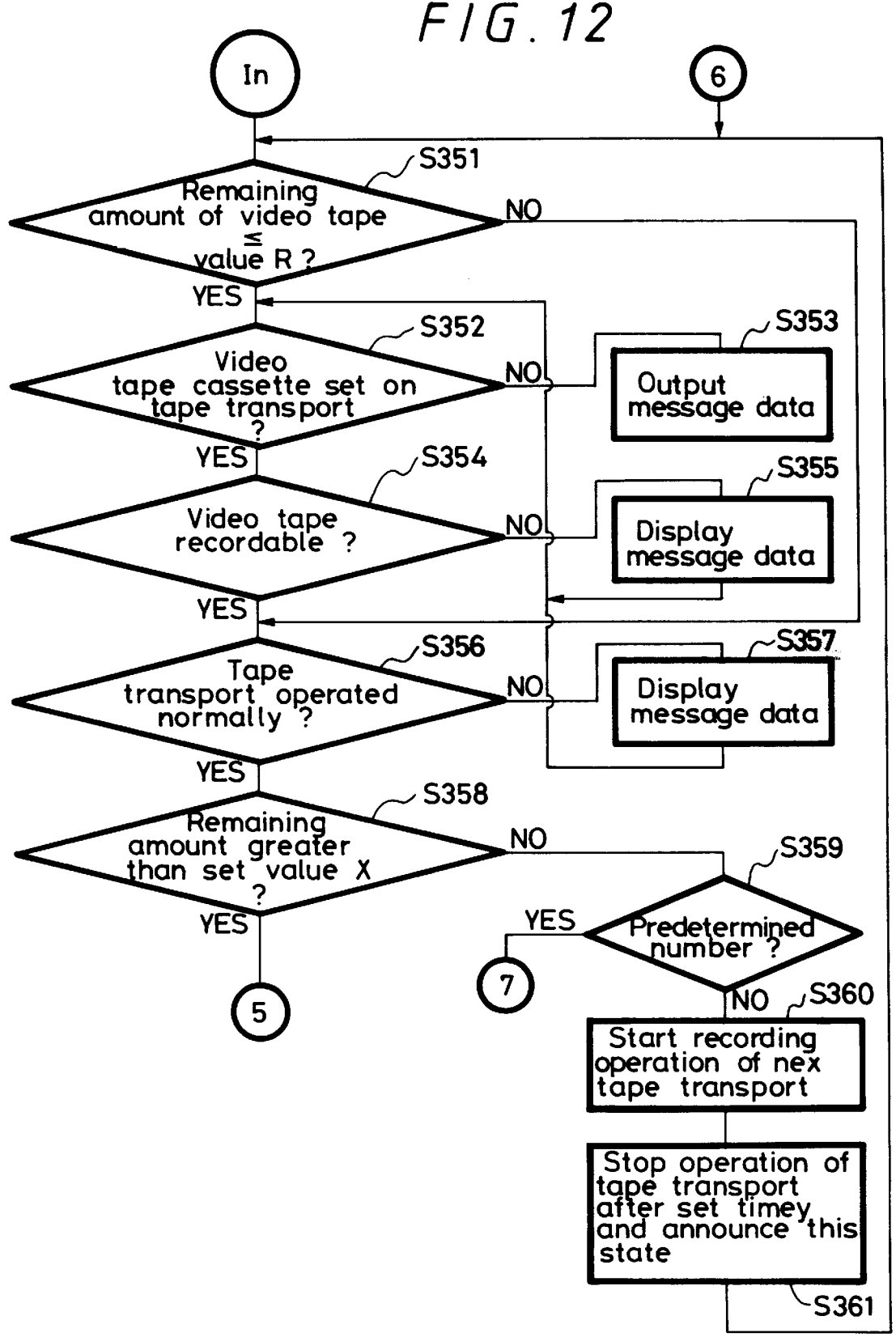
Figure 13:
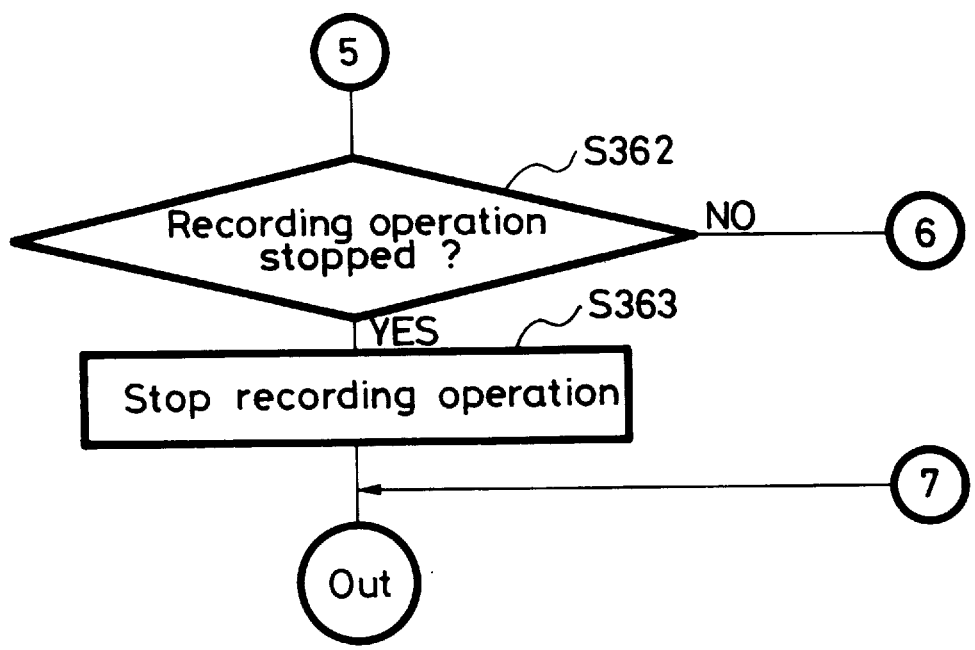

Referring to FIG. 12, it is determined in decision step S351 whether or not the remaining amount of the video tape is the set value R or smaller. Specifically, the remaining amount (remaining recordable time) of the video tape of the video tape cassette is detected by using the system shown in FIG. 4, and it is determined whether or not the detected remaining amount is smaller than the set value R. The set value R might be set by the cameraman by operating the operation unit 20 or previously-stored in the ROM 42 shown in FIG. 3 as a default. If a YES is output at decision step S351, then the processing proceeds to the next decision step S352. If a NO is output at decision step S351, then the processing proceeds to step S356.

It is determined in decision step S352 whether or not the video tape cassette is set in the tape transport, i.e., the output of the sensor which detects the video tape cassette is judged. If a YES is output at decision step S352, then the processing proceeds to the next decision step S354. If on the other hand a NO is output at decision step S352, then the processing proceeds to step S353.

In step S353, message data is output, i.e., message representing that the video tape cassette is not set in the tape transport is announced to the cameraman by superimposing the message data on the picture displayed on the display unit (not shown) or the viewfinder of the video camera unit 1 shown in FIG. 2. Then, the processing returns to step S352.

It is determined in decision step S354 whether or not the video tape can be recorded. The decision for determining whether or not the video tape is recordable is similar to step S208 in the flowchart shown in FIG. 6. If a YES is output at decision step S354, then the processing proceeds to the next decision step S356. If on the other hand a NO is output at decision step S354, then the processing proceeds to step S355.

In step S355, message data is displayed. Specifically, message representing that the tape transport 22 or 29 is in the failure state is displayed on the display portion (not shown) or the picture on the viewfinder of the video camera unit 1 shown in FIG. 2, similarly as described above. Then, the processing returns to step S352.

It is determined in decision step S356 whether or not the tape transport is operated normally. Specifically, similarly to the self-diagnosis operation described with reference to the flowchart of FIG. 8, it is determined by detecting that the mechanical portion is normally operated by the sensor or the like whether or not the tape transports 22 and 29 are operated normally. If a YES is output at decision step S356, then the processing proceeds to step S358. If on the other hand a NO is output at decision step S356, then the processing proceeds to step S357.

In step S357, message data is displayed, i.e., message indicating that the video tape of the video tape cassette thus set cannot be recorded is displayed on the display unit (not shown) or on the picture on the viewfinder of the video camera unit 1 shown in FIG. 2. Then, the processing returns to step S352.

It is determined in decision step S358 whether or not the remaining amount of the video tape of the video tape cassette is greater than the set value X. If a YES is output at decision step S358, then the processing proceeds to step S362 of the flowchart shown in FIG. 13. If on the other hand a NO is output at decision step S358, then the processing proceeds to the next decision step S359. The set amount X might be set by the cameraman by operating the operation unit 20 or previously-stored in the ROM 42 shown in FIG. 3 as a default.

It is determined in decision step S359 whether or not the tape transport 22 or 29 carries out the recording at a predetermined number. If a No is output at decision step S359, then the processing proceeds to step S360. If on the other hand a YES is output at decision step S359, then the processing returns from this routine to the routine in the flowchart shown in FIG. 6, whereafter the processing is ended. Since this routine is the plural-times completion mode in which the tape transports 22 and 29 are set in the recording operation mode at a predetermined number, it is determined in decision step S359 whether or not the tape transports 22 and 29 both have already carried out the recording at a predetermined number. As a method of determining whether or not both of the tape transports 22 and 29 have already carried out the recording at a predetermined number, there can be used such one that the above-mentioned judgement is carried out by confirming a flag indicating the presence or absence of the recording and the number thereof stored in the register (not shown) of the system controller 21, for example, or in the RAM 43.

Alternatively, there might be provided a step before step S351 such that the cameraman enters the number of the recording operation or the whole recording time by means of the operation unit 20. When the cameraman enters the whole recording time, it is necessary to provide a processing routine in which the whole recording time is constantly calculated from each recording time of the video tape cassette and the number of the recording operation and the calculated result and the whole recording time are compared with each other, Thereafter it is determined on the basis of the compared result whether or not the recording is stopped.

In step S360, the recording operation of the next tape transport is started, i.e., the tape transport 22 or 29 is set in the recording operation state by supplying the automatic recording start control signal to the control unit 26 or 33 of the target tape transport 22 or 29. Then, the processing proceeds to the next step S361.

In step S361, the tape transport 29 or 22 is stopped after the set time Y is elapsed and this state is announced to the cameraman. Specifically, the recording operation of the tape transport 29 or 22 is stopped by supplying the stop control signal to the control unit 33 or 26 of the tape transport 29 or 22 after the set time Y is elapsed. Also, information indicating that the recording operation of the tape transport 29 or 22 is stopped is output to the display unit (not shown) or to the viewfinder of the video camera unit 1 shown in FIG. 2 to thereby announce this state to the cameraman. The set time Y is the set time X or smaller. Further, the cameraman might enter the set time Y by using the operation unit 20 similarly to the set times R and X or previously-stored in the ROM 42 shown in FIG. 3.

It is determined in decision step S362 whether or not the recording operation is stopped. Specifically, it is determined whether or not the cameraman enters the recording stop command by means of the operation unit 20. If a YES is output at decision step S362, then the processing proceeds to step S363. If on the other hand a NO is output at decision step S362, then the processing returns to step S351.

In step S363, the recording operation is stopped. Then, the processing returns from the sub-routine shown in FIG. 13 to the program shown in the flowchart of FIG. 6. More specifically, in the processing shown in FIGS. 12 and 13, so long as the cameraman does not enter the recording stop command by means of the operation unit 20, the recording is repeatedly and alternately carried out on the video tape cassette set in the tape transport 22 or 29 a plurality of times.

Processing operation of the mode 2 in which the video tape cassettes set in the tape transports 22 and 29 are selected and recorded will be described with reference to FIG. 14. The method of determining whether or not the video tape cassette is set in the tape transport, the remaining amount X, the method of determining whether or not the tape transport is operated normally and the display of various message data were already described and therefore need not be described in detail.

Figure 14:
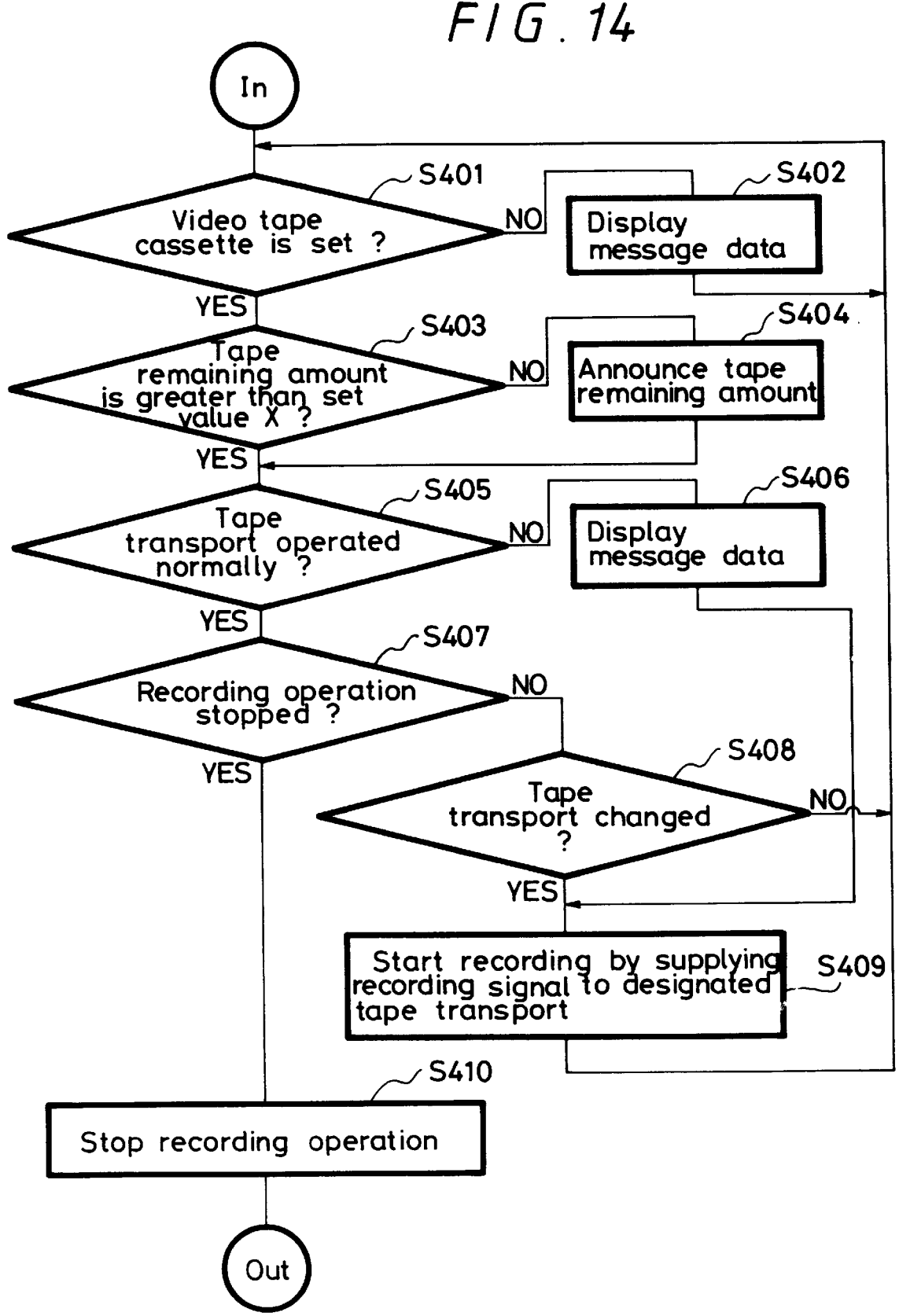

Referring to FIG. 14, it is determined in decision step S401 whether or not the video tape cassette is set in the tape transport. If a YES is output at decision step S401, then the processing proceeds to the next decision step S403. If on the other hand a NO is output at decision step S401, then the processing proceeds to step S402.

It is determined in decision step S403 whether or not the tape remaining amount is the set value X or greater. If a YES is output at decision step S403, then the processing proceeds to the next decision step S405. If on the other hand a NO is output at decision step S403, then the processing proceeds to step S404.

In step S404, message data is displayed, and then the processing returns to step S401.

It is determined in decision step S405 whether or not tape transport is operated normally. If a YES is output at decision step S405, then the processing proceeds to the next decision step S407. If on the other hand a NO is output at decision step S405, then the processing proceeds to step S406.

In step S406, message data is displayed, and then the processing proceeds to step S409.

It is determined in decision step S407 whether or not the recording is stopped. If a YES is output at decision step S407, then the processing proceeds to the next step S410. If on the other hand a NO is output at decision step S407, then the processing proceeds to step S408.

It is determined in decision step S408 whether or not the tape transport is changed. Specifically, it is determined whether or not the cameraman enters a command for changing the tape transport 22 or 29 into the tape transport 29 or 22 by means of the operation unit 20 shown in FIG. 2. If a YES is output at decision step S408, then the processing proceeds to step S409. If on the other hand a NO is output at decision step S408, then the processing returns to step S401.

In step S409, the recording is started by supplying the recording signal to the designated tape transport. Specifically, if it is determined in decision step S408 that the tape transport 22 or 29 is changed into the tape transport 29 or 22, then the recording signal is supplied to the tape transport 22 or 29 and the recording operation control signal is supplied to the control unit 26 or 33 of the tape transport 22 or 29. This control signal is the recording control signal P1 or P2 output from the input and output terminal 46b or 46c of the serial interface circuit 46 shown in FIG. 3. Then, the processing returns to step S401.

In step S410, the recording is stopped, and the processing returns from the routine shown in FIG. 14 to the routine shown in FIG. 6, whereafter the processing is ended.

In the recording processing according to the mode 2 shown in FIG. 14, the cameraman can not only record the recording signal until the remaining amount of the video tape of the video tape cassette set in the tape transport 22 or 29 is lost but also record the recording signal on the video tape of the video tape cassette while one tape transport 22 or 29 is changed to the other tape transport 29 or 22 during the recording. For example, when it is announced to the cameraman in step S406 that the tape transport 22 or 29 is operated abnormally, the cameraman can switch the abnormal tape transport 22 or 29 into the tape transport 29 or 22 by operating the operation unit 20 shown in FIG. 2.

Processing operation according to the mode 3 in which the recording is simultaneously carried out on a plurality of tape transports 22 and 29 will be described with reference to FIG. 15. A method of determining whether or not the video tape cassette is set in the tape transport, the tape remaining amount X, a method of determining whether or not the tape transport is operated normally and the display of various message data were already described many times and therefore need not be described in detail.

Figure 15:
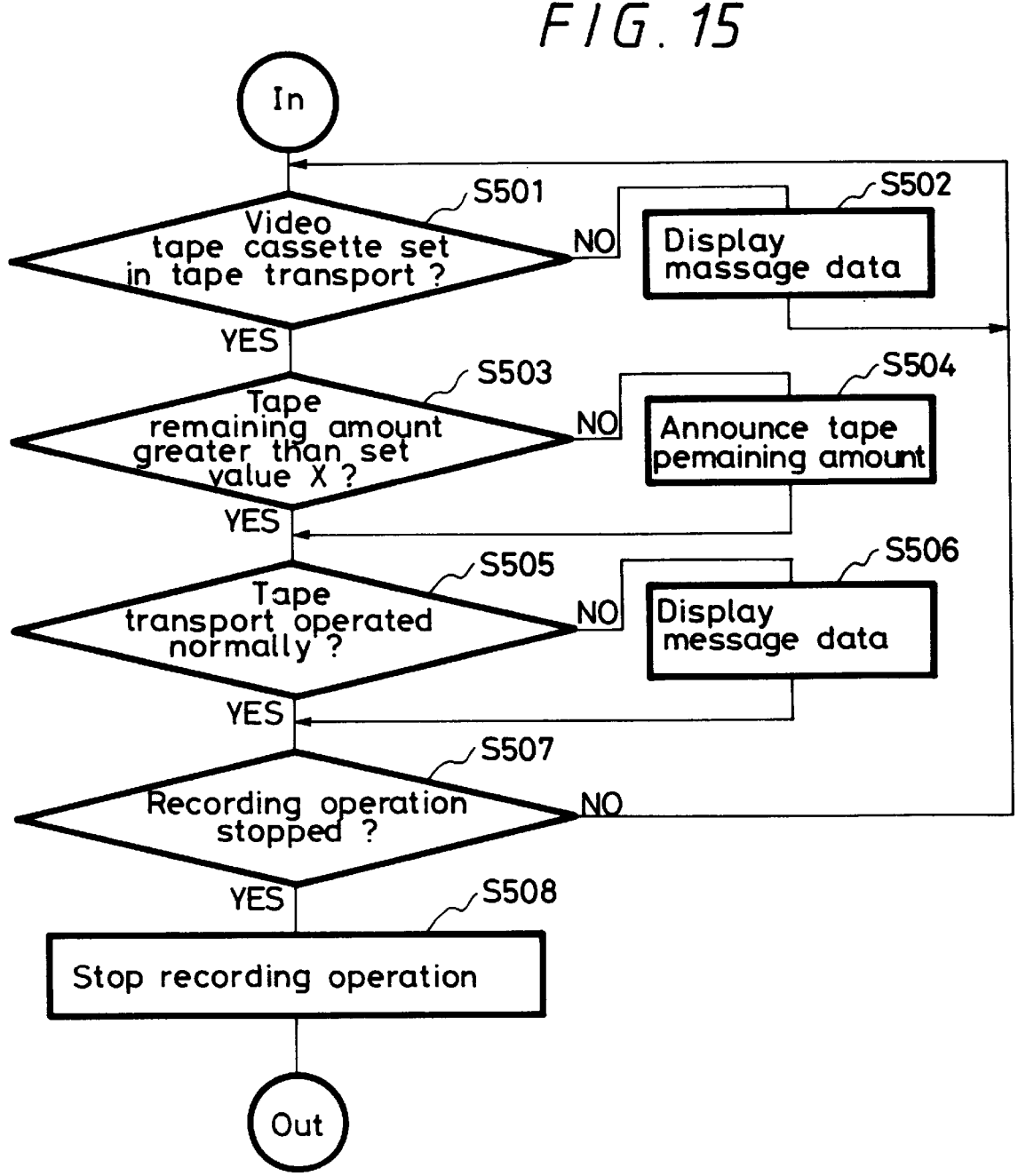

Referring to FIG. 15, it is determined in decision step S501 whether or not the video tape cassette is set in the tape transport. If a YES is output at decision step S501, then the processing proceeds to the next decision step S503. If on the other hand a NO is output at decision step S501, then the processing proceeds to step S502.

In step S502, message data is displayed and then the processing returns to step S501.

It is determined in decision step S503 whether or not the tape remaining amount of the video tape is greater than the set value X. If a YES is output at decision step S503, then the processing proceeds to the next decision step S505. If on the other hand a NO is output at decision step S503, then the processing proceeds to step S504.

In step S504, message data is displayed, and the processing proceeds to the next decision step S505.

It is determined in decision step S505 whether or not the tape transport is operated normally. If a YES is output at decision step S505, then the processing proceeds to the next decision step S507. If on the other hand a NO is output at decision step S505, then the processing proceeds to step S506.

In step S506, message data is displayed, and then the processing returns to step S501. If one of the tape transports is in the failure state, then the recording may be carried out on one tape transport 22 or 29.

It is determined in decision step S507 whether or not the recording is stopped. If a YES is output at decision step S507, then the processing proceeds to step S508. If on the other hand a NO is output at decision step S507, then the processing returns to step S501.

In step S508, the recording operation is stopped. Then, the processing returns from the routine shown in FIG. 15 to the routine shown in FIG. 6.

In the recording processing according to the mode 3 shown in FIG. 15, the cameraman can simultaneously record the recording signals on the video tapes of the video tape cassettes respectively set in the tape transports until the tape remaining amount of the video tape of the video tape cassette is lost.

As described above, according to this embodiment, since the single-unit video camera-recorder includes the two tape transports 22, 29 and records the video signal (including the audio signal) by using the mode 1 comprised of the continuous mode in which the recording signal is continuously recorded on the video tapes of the video tape cassettes by alternately using the two tape transports 22 and 29, the one-time completion mode in which the recording signal is continuously recorded on the video tapes of the two video tape cassettes by using the two tape transports 22 and 29 one time each and the plural-times completion mode in which the recording signal is continuously recorded on a plurality of video tapes by using the two tape transports 22 and 29 a plurality of times, the mode 2 in which the recording is carried out by selectively using one of the two tape transports 22 and 29 and the mode 3 in which the recording signal is simultaneously recorded on the video tapes of the video tape cassettes set in the two tape transports 22 and 29, when a long time recording is carried out, the recording can be prevented from being interrupted and the recording can be carried out with ease. Moreover, desired events to be recorded can be recorded reliably.

While the present invention is applied to the single-unit video camera-recorder as described above, the present invention is not limited thereto and can be applied to the VTR. Further, the present invention can be applied to equipments for recording video data, audio data and digital data, such as a system using a magneto-optical disc and a hard disc as a recording medium, an electronic still camera, a recording equipment (portable recording equipment) or the like, with substantially similar effects being achieved.

Further, the present invention can be applied to a system using a magneto-optical disc as a recording medium, such as a system in which an input equipment, such as a video camera and a microphone is connected to the magneto-optical disc or the hard disc, with similar effects being achieved.

Furthermore, when a cry of wild animal is recorded or when a recording chance should not be missed, the recording can be carried out reliably. Therefore, the present invention can be applied to all sorts of recording equipments and systems, such as a tape recorder using a compact tape cassette, a DAT (digital audio tape recorder), a tape recorder using a MTR (multi-track recorder), recording equipments using a hard disc and a magneto-optical disc, with similar effects being achieved.

According to the single-unit video camera-recording apparatus of the present invention, since the signal processing means processes the output signal of the camera unit in a predetermined fashion and N recording means record the output signal from the signal processing means on the recording medium, when the long-time recording is carried out, the recording can be prevented from being interrupted, and the recording can be carried out with ease. Moreover, the desired event can be recorded with ease.

According to the recording apparatus of the present invention, since the signal processing means processes the signal from the signal source in a predetermined fashion and N recording means record the output signal from the signal processing means on the recording medium, when the long-time recording is carried out, the recording can be prevented from being interrupted and the recording can be carried out with ease. Moreover, the recording can be carried out reliably.

According to the present invention, since the mode setting means sets the mode in which the recording is carried out by using N recording means and the control means controls the N recording means on the basis of the mode set by the mode setting means, the recording corresponding to the cameraman's object can be carried out in addition to the above-mentioned effects.

According to the present invention, since the detecting means detects the recording time or the remaining recordable time of the recording media set in the N recording means and the recording operation control means energizes other recording means of N recording means on the basis of the detected result of the detecting means when the remaining recordable time of the recording means, which is set in the recording operation mode at present, reaches the predetermined time, in addition to the above-mentioned effects, the recording can automatically and reliably be carried out without causing a trouble for the cameraman.

According to the present invention, since the recording medium set judging means determines whether or not recording media are set in the N recording means and the recording operation of the recording means to be energized in recording is started if the judged result from the judging means indicates that the recording medium is set in the recording means to be energized in recording when the recording means sets any one of the N recording means in the recording mode, in addition to the above-mentioned effects, the apparatus becomes easier for the user to handle and the recording can be carried out reliably.

According to the present invention, since the message indicating that the recording medium is not set in the recording means is announced to the user if it is determined by the recording medium set detecting means that at least the recording medium is not set in the recording means, in the addition to the above-mentioned effects, the apparatus become easier for the user to handle and the recording can be carried out reliably.

According to the present invention, since the state detecting means detects the states of the N recording means, in addition to the above-mentioned effects, the apparatus become easier for the user to handle and the state of the apparatus, such as a failure or the like, can be informed to the user. Therefore, the recording can be carried out reliably.

According to the present invention, since the mechanism system operation detecting means detects whether or not the mechanical systems of the N recording means are operated in a predetermined manner, the control signal supply detecting means detects whether or not the control signal from the control means is normally supplied to the N recording means and the message indicative of the operation failure is announced to the control means by the announcing means when the operation failure is detected on the basis of the detected results of the mechanical system operation detecting means and the control signal supply detecting means, in addition to the above-mentioned effects, the apparatus become easier for the user to handle and the state, such as a failure or the like, can be informed to the user. Therefore, the recording can be carried out reliably.

Further, according to the present invention, since the N recording means include reproducing means for reproducing signals recorded by the N recording means, the judging means judges the level of the reproduced output from the reproducing means and a message indicating that the judged result is abnormal is announced by the announcing means to the control means when the judged result from the judging means indicates the abnormality, in addition to the above-mentioned effects, the apparatus become easier for the user to handle and the state, such as the failure or the like, can be informed to the user. Therefore, the recording can be carried out reliably.

Furthermore, according to the present invention, since the mode setting means sets the continuous mode in which the N recording means are sequentially set in the recording mode and the recording is carried out continuously, the completion mode in which the recording operation is stopped when all of the N recording means carry out the recording operation M times and the simultaneous recording mode in which the N recording means are all set in the recording mode and the simultaneous recording is carried out, in addition to the above-mentioned effects, the recording agreed with the user's object can be carried out. More specifically, the recording of time corresponding to the N recording media can be carried out in the continuous mode, the recording of time corresponding to N×M recording media can be carried out in the completion mode, and a recording medium in which the same N data are recorded can be obtained. Also, the recording can be prevented from being failed.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A recording apparatus, comprising:

first and second recording means for recording an information signal to first and-second recording media, respectively, said first and second recording means each including a remaining amount detecting means for detecting a remaining amount of said respective recording medium, and ready state detecting means for detecting whether or not said first or second recording means are ready to record said information signal and outputting a status of each recording means;

indicating means for indicating the status of said first and second recording means; and control means operable in a switching mode for selectively placing said first and second recording means in a recording state wherein recording is initiated and a waiting state wherein recording is inhibited, wherein said control means places said first recording means in said recording state, places said second recording means in said waiting state when said detected remaining amount of said first recording medium is less than or equal to a first predetermined value and controls said ready state detecting means to output a not ready status for said second recording means, and wherein said control means, after detection of a second predetermined value which is smaller than said first predetermined value and placing said second recording means in said waiting state, places said second recording means from said waiting state to said recording state such that both said first and second recording means record when said detected remaining amount of said first recording medium is less than or equal to said second predetermined value and causes said ready state detecting means to output a ready status for said second recording means, and wherein said control means, after placing said first and second recording means in said recording state, then places said first recording means to said waiting state from said recording state after a preset period following the detection of said second predetermined value, said preset period being less than said second predetermined value but greater than zero.

2. A recording apparatus according to claim 1, wherein said control means is further operable in a single mode for selectively placing only one of said first and second recording means into said recording state.

3. A recording apparatus according to claim 1, wherein said control means is operable in a simultaneous mode for placing said first and second recording means into said recording state simultaneously.

4. A recording apparatus according to claim 1, further comprising selection means for selecting one of a continuous mode, a one-time mode or a plural times mode when said control means is operable in said switching mode, wherein, when said continuous mode is selected, said control means is operable to alternatively place said first and second recording means to said recording state from said waiting state continuously; when said one-time mode is selected, said control means is operable to place said first and second recording means to said recording state from said waiting state, so that each recording means is placed into said recording state once during said one-time mode; and when said plural times mode is selected, said control means is operable to alternatively place said first and second recording means to said recording state from said waiting state a plural number of times each.

5. A recording apparatus according to claim 1, wherein said recording apparatus is constructed as a video camera integrally formed with first and second recording devices.

6. A recording apparatus according to claim 1, wherein each respective recording medium is a video tape.

7. A recording apparatus according to claim 1, wherein said ready state detecting means detects whether or not recording media are set in said first and second recording means.

8. A recording apparatus according to claim 1, wherein said ready state detecting means detects whether or not said first and second recording means are inhibited from recording said information signals on their respective recording media.

9. A recording apparatus, comprising:

a plurality of recording means for recording an information signal to a respective recording medium, each of said plurality of recording means including a remaining amount detecting means for detecting a remaining amount of said respective recording medium, and ready state detecting means for detecting whether or not said plurality of recording means are ready to record said information signal and outputting a status of each recording means;

indicating means for indicating the status of said plurality of recording means; and control means operable in a switching mode for selectively placing said plurality of recording means in a recording state wherein recording is initiated and a waiting state wherein recording is inhibited, wherein said control means places a first of said plurality of recording means in said waiting state and a second recording means in said recording state, controls said indicating means to indicate that said first recording means is not ready to record when said detected remaining amount of another recording medium is less than or equal to a first predetermined value and said ready state detecting means outputs a not ready status of the first recording means, and wherein said control means, after detection of a second predetermined value which is less than said first predetermined value and placing said first recording means in said waiting state, places the first recording means to said recording state from said waiting state such that both said first and second recording means record when said detected remaining amount of said another recording medium is less than or equal to said second predetermined value and said ready state detecting means outputs a ready status of the first recording means, and wherein said control means, after placing said first and second recording means in said recording state, then places said another recording means to said waiting state from said recording state after a preset period following the detection of said second predetermined value, said preset period being less than said second predetermined value but greater than zero.

10. A recording apparatus according to claim 9, wherein said control means is further operable in a single mode for selectively placing only one of said plurality of recording means into said recording state.

11. A recording apparatus according to claim 9, wherein said control means is further operable in a simultaneous mode for selectively placing a multiple of said plurality of recording means into said recording state simultaneously.

12. A recording apparatus according to claim 9, further comprising selection means for selecting one of a continuous mode, a one-time mode or a plural times mode when said control means is inoperable in said switching mode, wherein, when said continuous mode is selected, said control means is operable to alternatively place successive ones of said plurality of recording means to said recording state from said waiting state continuously; when said one-time mode is selected, said control means is operable to successively place respective ones of said plurality of said recording means to said recording state from said waiting state, so that each of said plurality of recording means is placed in said recording state once during said one-time mode; and when said plural times mode is selected, said control means is operable to alternatively place successive ones of said plurality of recording means to said recording state from said waiting state a plural number of times each.

13. A recording apparatus according to claim 9, wherein said recording apparatus is constructed as a video camera integrally formed with a plurality of recording devices.

14. A recording apparatus according to claim 13, wherein each respective recording medium is a video tape.

15. A recording apparatus according to claim 9, wherein said ready state detecting means detects whether or not recording media are set in said plurality of recording means.

16. A recording Apparatus according to claim 9, wherein said ready state detecting means detects whether or not said plurality of recording means are inhibited from recording said information signals on their respective recording media.

* * * * *